US009690275B2

United States Patent
Gan et al.

(10) Patent No.: US 9,690,275 B2
(45) Date of Patent: *Jun. 27, 2017

(54) SYSTEM ENERGY EFFICIENCY CONTROLLER, ENERGY EFFICIENCY GAIN DEVICE AND SMART ENERGY SERVICE SYSTEM USED FOR ENERGY UTILIZATION

(75) Inventors: Zhongxue Gan, LangFang Hebei (CN); Hao Wu, LangFang Hebei (CN); Qing Tang, LangFang Hebei (CN); Jinlai Li, LangFang Hebei (CN); Zhenlei Fang, LangFang Hebei (CN); Tao Liu, LangFang Hebei (CN)

(73) Assignee: ENN SCIENCE & TECHNOLOGY DEVELOPMENT CO., LTD., Langfang, Hebei (CN)

( * ) Notice: Subject to any disclaimer, the term of this patent is extended or adjusted under 35 U.S.C. 154(b) by 1167 days.

This patent is subject to a terminal disclaimer.

(21) Appl. No.: 13/695,153

(22) PCT Filed: Apr. 29, 2011

(86) PCT No.: PCT/CN2011/073553
§ 371 (c)(1),
(2), (4) Date: Dec. 4, 2012

(87) PCT Pub. No.: WO2011/134430
PCT Pub. Date: Nov. 3, 2011

(65) Prior Publication Data
US 2013/0073098 A1    Mar. 21, 2013

(30) Foreign Application Priority Data
Apr. 30, 2010    (CN) .......................... 2010 1 0173433

(51) Int. Cl.
G05B 19/02    (2006.01)
H02J 3/32    (2006.01)
H02J 3/38    (2006.01)

(52) U.S. Cl.
CPC ................ *G05B 19/02* (2013.01); *H02J 3/32* (2013.01); *H02J 3/38* (2013.01); *H02J 3/381* (2013.01);
(Continued)

(58) Field of Classification Search
CPC ...... H02J 3/32; H02J 3/38; H02J 3/381; H02J 3/382; H02J 3/383; H02J 3/386;
(Continued)

(56) References Cited

U.S. PATENT DOCUMENTS 6,700,802 B2 *    3/2004    Ulinski .................... H02J 3/32
                                                                    307/66
2002/0082747 A1 *    6/2002    Kramer .................... H02J 3/00
                                                                    700/276
(Continued)

FOREIGN PATENT DOCUMENTS

CN    1945472 A    4/2007
CN    1958723 A    5/2007
(Continued)

OTHER PUBLICATIONS

Leonhard et al, "Machine Translation of WO 2009/019159 Support of a Sustainable Energy Supply Having a Carbon Cycle Using Regeneratnely Generated Hydrogen", Feb. 12, 2009, Espacenet, pp. 1-17.*

(Continued)

*Primary Examiner* — Miranda Huang
*Assistant Examiner* — Olvin Lopez Alvarez
(74) *Attorney, Agent, or Firm* — Moore & Van Allen PLLC

(57) ABSTRACT

A system energy efficiency controller connected (105) to at least one of an energy generation device (101), an energy storage device (102), an energy utilization device (103) and an energy regeneration device (104) is disclosed for enabling energy utilization. Said system energy efficiency controller (105) cooperatively controls the input and output of a ubiquitous energy flow of at least one of the energy generation device (101), the energy storage device (102), the energy utilization device (103) and the energy regeneration device (104). Said ubiquitous energy flow includes at least one of an energy flow, a material flow, and an information flow. Also disclosed are an energy efficiency gain device, an energy efficiency matching station and a smart energy service system, which are connected with the controller (105). The present invention optimizes the entire process of energy utilization using the system energy efficiency controller (105), thus improving the system energy efficiency.

17 Claims, 6 Drawing Sheets

(52) U.S. Cl.
CPC .............. *H02J 3/382* (2013.01); *H02J 3/383* (2013.01); *H02J 3/386* (2013.01); *Y02E 10/563* (2013.01); *Y02E 10/566* (2013.01); *Y02E 10/763* (2013.01); *Y02E 70/30* (2013.01)

(58) Field of Classification Search
CPC ....... G05B 19/02; Y02E 70/30; Y02E 10/763; Y02E 10/563; Y02E 10/566
USPC .......................................... 700/286, 291, 295
See application file for complete search history.

(56) References Cited

U.S. PATENT DOCUMENTS

| | | | | |
|---|---|---|---|---|
| 2008/0022683 | A1* | 1/2008 | Ohler | F02C 6/14 60/641.8 |
| 2008/0167756 | A1 | 7/2008 | Golden et al. | |
| 2008/0211230 | A1* | 9/2008 | Gurin | B60L 11/1861 290/2 |
| 2008/0271137 | A1* | 10/2008 | Sinn | H04L 12/4633 726/15 |
| 2008/0303348 | A1* | 12/2008 | Witters | H02J 3/46 307/72 |
| 2009/0076661 | A1* | 3/2009 | Pearson | H01M 8/04619 700/291 |
| 2009/0281677 | A1* | 11/2009 | Botich | G06Q 30/0283 700/295 |
| 2010/0262313 | A1* | 10/2010 | Chambers | G06Q 10/04 700/295 |
| 2011/0081586 | A1* | 4/2011 | McAlister | C25B 1/00 429/422 |
| 2011/0106321 | A1* | 5/2011 | Cherian | H02J 3/00 700/286 |
| 2012/0255302 | A1* | 10/2012 | Hugelman | F22B 1/167 60/651 |
| 2014/0148964 | A1* | 5/2014 | Gan | G06Q 50/06 700/297 |

FOREIGN PATENT DOCUMENTS

| | | |
|---|---|---|
| CN | 101675244 A | 3/2010 |
| CN | 101689277 A | 3/2010 |
| WO | 2008109264 A1 | 9/2008 |
| WO | 2009076626 A2 | 6/2009 |
| WO | 2009082721 A1 | 7/2009 |

OTHER PUBLICATIONS

Feng et al, "Machine Translation of CN 1945472 Central Optimum Control Method for Cold, Heat and electricity three way energy supply system", Apr. 11, 2007, Espacenet, pp. 1-7.*
Fu et al, ("Laboratory research on combined cooling, heating and power (CCHP) systems"), Feb. 10, 2009. Elsevier, pp. 977-982.*
Wang et al, "Optimization of capacity and operation for CCHP system by genetic algorithm", Aug. 26, 2009, pp. 1325-1335.*
Cho et al, "Evaluation of CCHP systems performance based on operational cost, primary energy consumption, and carbon dioxide emission by utilizing an optimal operation scheme", May 13, 2009, pp. 2540-2549.*
International energy agency, "Cogeneration and district energy", 2009, pp. 57.*
Liyanage et al, "Coordinated Control of Elements in Ubiquitous Power Networks to Support Load Frequency Control", Dec. 31, 2009. pp. 430-435.*
Song, "Architecture and Optimization Approach of Ubiquitous Energy Network (UEN)", 2011, pp. 1573-1578.*
Hao, "Combined Cooling, Heating and Power (CCHP) in Distributed Generation (DG)", Apr. 21, 2006, pp. 28/.*
Feng et al, "Prospects for Distributed Combined Cooling, Heating, and Power Systems in China", 2004, pp. 1-17.*
ENN Science & Technology Development Co., Ltd. et al., International Search Report for International Application No. PCT/CN2011/073553 dated Aug. 4, 2011, 5 pages.
Han, Xiao-Ping; "One of development directions of Chinese energy technology in the next 20 years—Distributed energy and relevant technology," Journal of Shenyang Institute of Engineering, 2005, pp. 13-16, vol. 1.

* cited by examiner

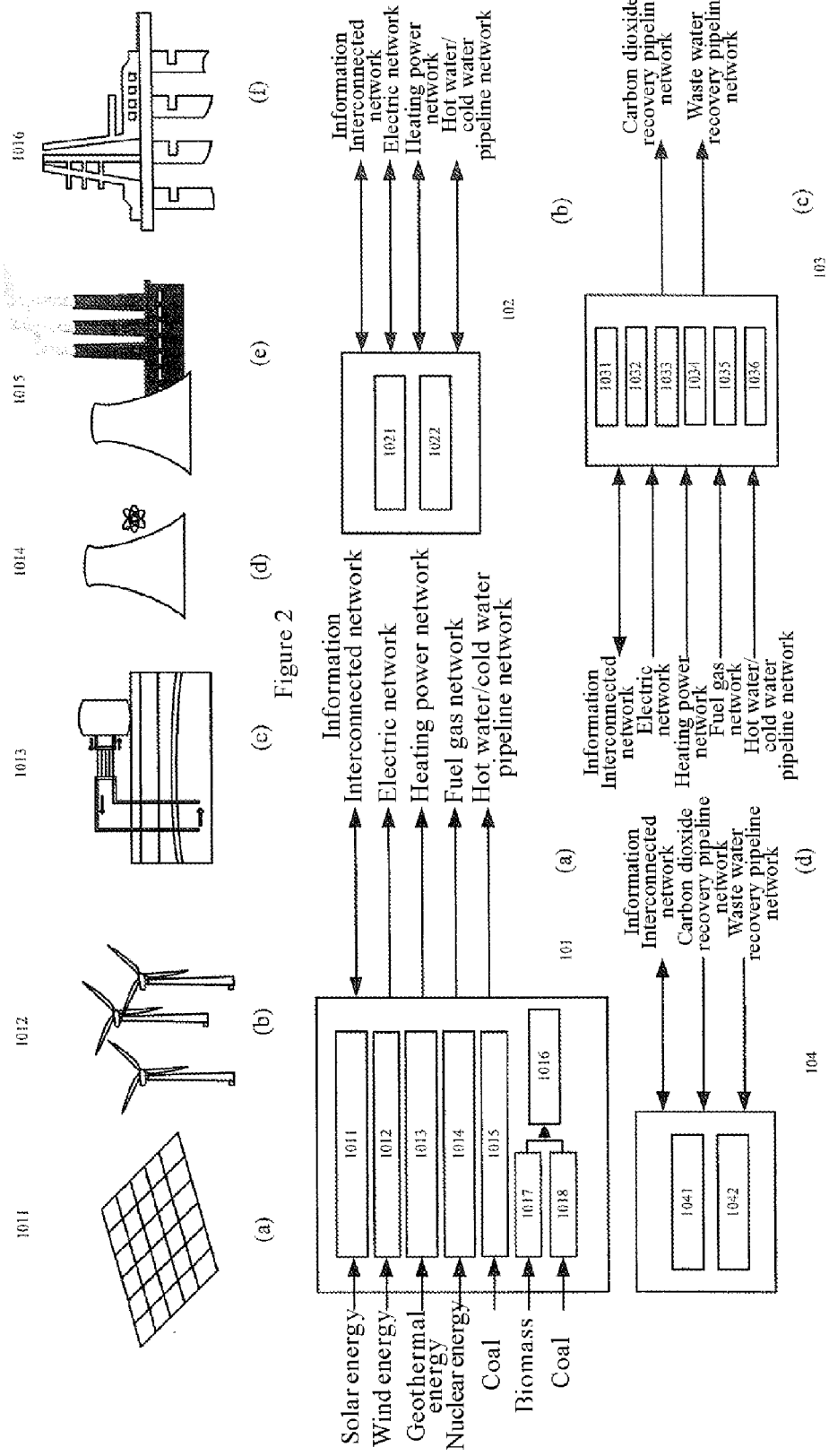

SYSTEM ENERGY EFFICIENCY CONTROLLER, ENERGY EFFICIENCY GAIN DEVICE AND SMART ENERGY SERVICE SYSTEM USED FOR ENERGY UTILIZATION

FIELD OF THE INVENTION

The present invention relates to a system and a method for energy utilization, and in particular, to a system energy efficiency controller, an energy efficiency gain device, an energy efficiency matching station and a smart energy service system for realizing distributed energy optimization and utilization.

BACKGROUND OF THE INVENTION

So far, people's modern life is basically based on various utilization of primary fossil energy represented by petroleum, coal and natural gas. The development relying on fossil energy in the world for more than half a century results in a serious consequence, i.e. the increasing deterioration of global climate and environment. A climate change has become a tough restriction on the development of global economy, and an environment problem has become the most serious challenge to the sustainable development of the world.

On the other hand, fossil energy tends to be exhausted due to the continuous consumption. It has been predicted that the global petroleum reserves will be exhausted in around 2050, the global natural gas reserves will be exhausted at around 2050, and the supply of the global coal reserve may last for up to 169 years. Therefore, the energy problem has become an essential problem to the development of society and economy.

The key of the energy problem is to develop a low-carbon economy, that is, to employ clean substitutive energy, to improve the energy utilization efficiency and to recycle, so as to reduce the discharge of greenhouse gasses and other pollutants and obtain the greatest yield of the whole society accordingly. By technique innovation and system innovation of energy, the climate change may be alleviated and the sustainable development of human beings may be realized. Low-carbon economy is regarded as the fifth revolutionary wave after industrial revolution and information revolution, and low carbon and high efficiency will be a part of the future prevailing life mode.

In the prior art, attentions are much paid to the utilization of one of the energy sources, i.e., electric energy, and a technology for improving the utilization efficiency of electric energy by using information technology has been employed.

A Chinese scholar, Wu Jiandong, has put forward an interactive electric network, which realizes the intelligentized, informatized and classified interactive management of the overall flow of electric power industry, such as electric power generation, electric power transmission, power supply, power utilization, power marketing, classified scheduling of electric network and integrated services, etc., by equipping a system digital equipment and upgrading the electric network management system, based on an opening and interconnected information mode. However, the interactive electric network is not feasible due to the lack of specific technical solution for such network.

In USA, the Smart Electric Network in the Energy Plan put forward by the Obama government is to: establish a uniform electric network across the four time zones of USA; develop the smart electric network industry, improve the value and efficiency of the national electric network of USA to the greatest extent, and gradually realize the uniform networking management of solar energy, wind energy and geothermal energy in USA; and fully propel the distributed energy management.

The IEEE works out standards and communication principles for smart electric network (IEEEP2030), which includes three aspects of power engineering, information technology and communications.

Moreover, GE energy of USA also sets forth a concept of "smart electric network" (or named as energy interconnected network), that is, a bidirectional information flow, a multi-directional energy flow and a closed-loop automatic control are provided in the existing electric network, so that an intelligentized decision can be made on energy utilization, which is favourable to manage and improve the efficiency of energy utilization. Although the closed-loop automatic control according to the information from the information flow is an important direction of future electric network, GE energy does not put forward a specific technical solution.

US patent application US20090281677 to Taft et al. discloses a "smart electric network" for improving electric network management, which mainly includes aspects of: improving the digitalization level by connecting the assets and equipment via sensors; data integration system and data collection system; and the ability of analyzation, i.e., performing related analyzation according to the data obtained, so as to optimize the operation and management. Through the optimized management of each stage of the generation, transmission and retail of electric power, the enterprises involved can improve the operation efficiency and reliability and lower the costs.

US patent application US20090281677 assigned to Energy and Power Solutions discloses a system and a method for optimizing energy utilization and alleviating the influence on environment, where, data of a utilization end (i.e., energy consumption facility) is collected via a communication network, and the data collected is processed and analyzed, thus the manager of the utilization end may find a way for energy saving and emission reduction.

US patent application US20080039979 assigned to V2 Green discloses a system and a method for electric energy convergence and distribution, where, the electric energy provided by distributed power supplies via a manner of united power supplying is supplied to a utilization end, and the information of the power supplying end, the utilization end and the electric network is sent to a flow control center via the interconnected network. This patent application also proposes to take the battery of an electrically-propelled vehicle and a super-capacitor as the interconnected electric energy storage devices, which may be connected to the electric network intermittently or permanently.

In the above prior art, the intelligentization of the generation, transmission and utilization of electric energy is realized by combining the existing electric network with network communication technologies.

However, besides the above specific disadvantages, the existing energy utilization solution is further defective in the following three aspects.

Firstly, the above prior art only relates to the energy efficiency optimization of single energy (i.e., electric energy) utilization for the main purpose of equipment energy saving or enterprise energy saving, rather than realizing the integration and optimization of various types of energy sources and realizing urban and regional energy saving.

In the schematic diagram of an energy utilization system in the prior art shown in FIG. 1, an electric power plant 11, a boiler 12 and a fuel gas generating or storing device 13 independently provides electric energy, heat energy and fuel gas to a user via an electric network 21, a heating network 22 and a fuel gas network 23, respectively, for the use by a power utilization device 31, a heating device 32 and a fuel gas cooking utensil 33, respectively. The generation, transmission and use of these three energy sources are totally independent, those three energy networks are optimized respectively, and the matching between energy generation and energy utilization is basically based on steady-state optimization. However, no solution for coupling and utilizing different types of energy sources is put forward.

Next, as shown in FIG. 1, various energy sources are typically transmitted from the generation end to the utilization end unidirectionally in the utilization system thereof. In the solution of smart electric network that has been put forward, information collected via means such as smart meters may be transmitted bidirectionally in the information network. Moreover, if electric power is supplied unitedly by distributed energy sources, the utilization end may also generate electricity using solar electric power generation and transmit the electric power to the electric network. Therefore, in a smart electric network, the electric energy may also be transmitted bidirectionally. However, no solution for the generation and bidirectional transmission of energy except for electric energy is put forward.

Finally, in the prior art solution of smart electric network, information is transferred via an information communication network; however, it is generally used only for the management or decision of one of the power supplying end, the utilization end and the electric network, rather than for the energy efficiency optimization of the entire process of the generation, transmission and utilization of electric energy. The supplying end and the demanding end are optimized respectively, thus dynamic and cooperative optimization cannot be realized for both the supplying end and the demanding end.

SUMMARY OF THE INVENTION

In view of the above disadvantages of the existing energy utilization system, the inventors put forward a novel energy utilization system and method.

It is an object of the present invention to provide a ubiquitous energy network solution for realizing the couple and utilization of multiple energy sources (e.g. various types of energy sources and/or energy sources from a plurality of geographic locations), realizing the management and decision on distributed energy sources and performing energy efficiency optimization for the entire process of energy utilization.

It is another object of the present invention to provide a method for energy transaction and service, where, at least one of a plurality of types of energy sources is provided to a utilization end via the ubiquitous energy network according to the selection at the utilization end.

According to one aspect of the invention, there provides a system energy efficiency controller, which is connected to at least one of an energy generation device, an energy storage device, an energy utilization device and an energy regeneration device, wherein, the system energy efficiency controller cooperatively controls the input and output of a ubiquitous energy flow of the at least one of the energy generation device, the energy storage device, the energy utilization device and the energy regeneration device, and the ubiquitous energy flow includes at least one of an energy flow, a material flow and an information flow.

The ubiquitous energy flow includes a flow formed by cooperatively coupling of an energy flow, a material flow and an information flow.

According to another aspect of the invention, there provides an energy efficiency control method for managing energy utilization by a system energy efficiency controller, comprising the following steps:

a) obtaining, by the system energy efficiency controller, state information of an energy generation device, an energy storage device, an energy utilization device and an energy regeneration device;

b) determining, by the system energy efficiency controller, an optimization solution for the devices to operate cooperatively, according to the state information; and c) cooperatively controlling, by the system energy efficiency controller, the input and output of the ubiquitous energy flow of at least one of the energy generation device, the energy storage device, the energy utilization device and the energy regeneration device;

the ubiquitous energy flow includes at least one of an energy flow, a material flow and an information flow.

According to yet another aspect of the invention, there provides an energy efficiency gain device, which includes a distributed electric power generation device, a heat or cold generation device, a heat or cold storage device, and a potential energy pump connected with the energy utilization device, wherein, the potential energy pump consumes the electric energy provided by an electric energy generation device, upgrades the waste heat generated by an energy utilization device to be utilizable, and transmits the upgraded heat energy to a heat storage device or supplies the same directly to an energy utilization device for direct utilization.

According to yet another aspect of the invention, there provides a smart energy service system, which comprises a system energy efficiency controller and at least one of an energy generation device, an energy storage device, an energy utilization device and an energy regeneration device that is connected to the system energy efficiency controller, wherein, at least a part of the energy consumed by the smart energy service system is provided by itself.

The ubiquitous energy network establishes an innovative conception of smart ubiquitous energy flow and creates a smart energy, which is a brandnew energy system, including a brandnew energy structure, a brandnew energy generation and utilization mode and a brandnew energy conversion mode. The smart energy is used to realize the smart cooperation and recycle of the complete life-cycle of an energy, by taking a ubiquitous energy network as the carrier and coupling an information flow, an energy flow and a material flow, i.e., by ubiquitous energy flow management, based on the integrated utilization of a regenerable energy and environment potential energy, thereby optimizing the energy efficiency of the system.

The ubiquitous energy network is based on system energy efficiency technologies, and realizes cross-time domain and cross-space domain real-time cooperation of energy input and output of systematic multi-convariety mixed energy sources, via energy and information coupling at four stages of energy generation, storage, utilization and regeneration. Its key concept is to realize the maximization of energy utilization efficiency of the whole energy system during the complete life-cycle by optimizing and controlling the energy flow, material flow and information flow inside the four-stage system and between the system and the environment.

The energy efficiency control system performs supply-demand converting and matching, stepped utilization and spatio-temporal optimization on each energy flow, thereby achieving system energy efficiency maximization and finally outputting a selforganizing, highly-ordered and high-performance smart energy.

Through the optimization and control by the system energy efficiency controller, a node (for example, an eco-district constructed on the concept of ubiquitous energy network), a local area network (for example, a town constructed on the concept of ubiquitous energy network) and a wide area network of the ubiquitous energy network may synthetically consider the scientific and reasonable utilization of energy sources and resources according to the "grade" difference between different energy sources and resources as well as the difference and dynamic change between supply and demand, so that the grade is equivalent and the supply and demand are balanced, farthest realize energy saving and environmental protection, improve the overall energy utilization efficiency, reduce carbon discharge, and realize the sustainable development of energy, resources and environment.

The ubiquitous energy network employs interconnected network information communication technologies, thus not only energy structure is optimized and system energy efficiency is improved, but also business and market mode is innovated.

Even if CDM carbon tax transaction is not employed, the crisis of fossil energy shortage may also be solved. For example, if petroleum is even close to exhausting day by day, the price thereof will rise necessarily, and solutions that take petroleum as energy, for example, fuel automobile and fuel electric power generation, will necessarily lose their competitive power, while solutions of regenerable energy, for example, solar energy, will necessarily exhibit their hearty competitive power under the mechanism of ubiquitous energy network.

BRIEF DESCRIPTION OF THE DRAWINGS

FIGS. 2(a)-2(f) show examples of generation devices for various types of energy sources;

FIGS. 3(a)-3(d) show four stages of energy utilization and its relation to the physical pipeline network;

DETAILED DESCRIPTION OF THE EMBODIMENTS

Figure 1:
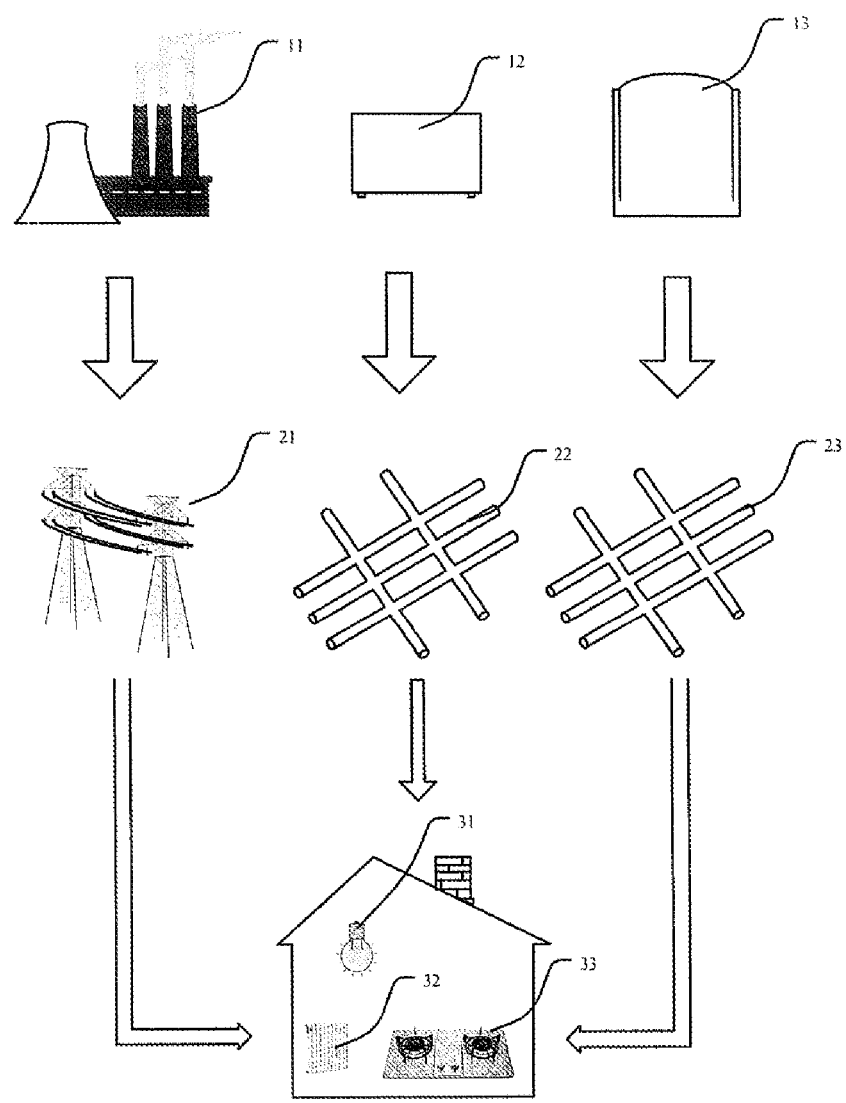
FIG. 1 is a schematic diagram of a system for realizing various types of energy utilization in the prior art.

First of all, the terms used in this application will be illustrated as follows.

A ubiquitous energy network is formed by nodes that are connected together via a virtual pipeline interconnected network architecture for transmitting a ubiquitous energy flow, with a ubiquitous energy flow being bidirectionally transmitted between the nodes. The nodes include a system energy efficiency controller, and at least one from a group consisted of other nodes connected to the system energy efficiency controller, an energy generation device, an energy storage device, an energy utilization device and an energy regeneration device. The system energy efficiency controller controls the input and output of ubiquitous energy flow of at least one of: the other nodes, the energy generation device, the energy storage device, the energy utilization device and the energy regeneration device; and the ubiquitous energy flow includes a logic smart flow formed by coupling and cooperating an energy flow, a material flow and an information flow.

The transmission equipments (pipeline networks or transmission equipments) of information, energy and material form the transmission equipments in the ubiquitous energy network.

The ubiquitous energy network includes a closed-loop smart energy network system formed with the complete life-cycle of an energy (energy generation, energy utilization, energy storage and energy regeneration which are named as four stages) connected via ubiquitous energy gateway equipments such as the system energy efficiency controller and the energy efficiency gain device, with a ubiquitous energy flow being used as the carrier of energy, material and information.

A ubiquitous energy flow refers to a logic smart flow formed by coupling and cooperating an energy flow, a material flow and an information flow. A transmission medium of the ubiquitous energy flow may be coupled physically and logically, and may be transmitted synchronously in a transmission equipment. The ubiquitous energy flow (or a state flow) is an exergy flow with smart control.

An energy flow includes electric energy, heat energy, pressure energy, tidal energy and mechanical energy, etc.

A material flow is at least one selected from the products generated by a cold, heat, electricity and energy regeneration device, and includes at least one of natural gas, hot water, cold water, steam, $CO_2$, biogas, etc. The material flow may be an energy carrier (for example, hot water and cold water), and an energy per se (for example, biomass and biogas for electric power generation).

An information flow includes the virtual tags of the energy generation device, the energy storage device, the energy utilization device and the energy regeneration device, and the real-time price information of the energy, etc.

A ubiquitous energy gateway connects the terminals of a ubiquitous energy network and includes the system energy efficiency controller and an optional energy efficiency gain device, and may accomplishes the distribution, buffering and conversion of a ubiquitous energy flow between nodes of the network.

A system energy efficiency controller connects smart terminals of equipments in the four stages, ubiquitous energy network node(s) and ubiquitous energy gateway(s) via a ubiquitous energy network, predicts the flow direction change and the flow quantity fluctuation in a future period of time according to the flow quantity and flow direction of the energy flow, the information flow and the material flow and the operating status of each equipment of the four stages that are monitored in real time, and timely adjusts control parameters of the ubiquitous energy network equipments such as the smart terminals, the ubiquitous energy network nodes and the ubiquitous energy gateways of the four stages, thereby not only fully utilizing the environment potential energy and updatable exergy, but achieving the optimal system energy efficiency. The system energy efficiency controller is not only a core to realize information and energy interaction and cooperation, but also the physical carrier to realize selforganized ordering of the system.

An environment potential energy refers to energy sources such as solar energy, geothermal energy and wind energy, and all the energy sources, that are within the region and space where the four-stage system exists, rather than obtained from the outside, and do not influence the obtainment of exterior energy, should be regarded as the environment potential energy of the system.

An energy efficiency refers to the efficiency or effect of energy utilization, and includes a group of parameters for evaluating the utilization effect of the system on the energy grade and quantity, for example, a thermal efficiency, an electrical efficiency and an exergy efficiency, etc.

A system energy efficiency refers to the efficiency or effect of energy utilization in a system, which includes a group of parameter for evaluating the utilization effect of the system on the grade and quantity of energy, for example, a thermal efficiency, an electrical efficiency and an exergy efficiency, etc. An important improvement of the system energy efficiency is the matching of the grade and quantity of energy supply with demands, which improves people's energy generation mode and energy utilization mode.

Four Stages of Energy Utilization

The inventors analyzed the multi-layer energy utilization systems for home, region and city and found that all energy utilization systems comprise four stages of energy generation, energy storage, energy utilization and energy regeneration.

In the stage of energy generation, fossil energy, biomass energy, solar energy and wind energy that are difficult to use are converted by a series of devices into electricity, gas and heat/cold energy that may be directly used. In any region, due to different natural resource endowments or different society and technology development degrees, the construction of the primary energy in the stage of energy generation may be significantly different. Therefore, a secondary energy structure with respective features is formed at the energy generation end.

Energy generation typically involves the generation of various types of energy sources, i.e., a full-rate exploitation of energy. For example, the final output from a power plant is not limited to electricity, and is a Combined Heat and Power system; since the solar energy efficiency is relatively low, thus the related product exploited should be a combined heat and power module for solar energy; and the biological energy may also be used to realize a Combined Heating, Cooling and Power module.

In the stage of energy utilization, the demand on the secondary energy structure varies more complicatedly, because different energy utilization ends demand for different structures and ratios of energy, and further the quantity and grade of energy required by the same utilization end may change. This situation causes a great waste of energy. At present, the efficiency of energy utilization is only about 30% from the stage of energy generation to the stage of energy utilization, thus an energy efficiency conversion and upgrade mechanism is urgently needed to maximumly utilize, in the utilization stage, the energy output in the stage of energy generation.

In the stage of energy utilization, a high-performance integrated system should be used, rather than the use of a single energy form and energy technology, for example in the building industry, an advanced outer envelop structure is employed for the thermal insulation of buildings, and a high-performance heat pump system and a frequency-variable central air conditioning system, etc., are employed; in the industrial field, an advanced energy-saving heat exchanger and an advanced reaction equipment are used; and in the transportation field, an advanced engine technology is used; that is, at the utilization end, the substantial efficiency upgrade of available energy is realized via an integrated technology system.

In the stage of energy storage, various types of energy sources such as electric energy, heat energy, cold energy and mechanical energy may be stored, and environment potential energy may be maximumly utilized via primary potential utilization and secondary potential utilization, thus the energy utilization efficiency of the system is improved.

The primary potential utilization above refers to a process in which solar energy or geothermal energy is directly utilized to supply energy to the utilization stage, and such utilization is instant, without delay. The secondary potential utilization above refers to a process in which energy is collected from the environment in the case that the energy is useless or difficult to use, but is obviously usable or is convenient for utilization in another period or place. For example, by taking the advantage of the energy storage stage, cold water in winter is stored at the phreatic layer and used in summer as refrigerating water for a warm-ventilation system of a building to cool a mansion, or cold energy in winter is stored in soil via buried pipes and then used in summer.

There are two modes of energy storage: in one mode, the type of energy is not changed during the storage process; while in the other mode, the energy is converted from one form into another form for storage. That is, in the stage of energy storage of the latter mode, energy conversion is involved. For example, the electricity generated by a solar battery is converted into chemical energy via electrolyzed water and stored in the form of hydrogen and oxygen.

The optimization of the energy storage stage includes: improving the efficiency of energy storage; reducing the energy loss during the storage process; and optimizing the control of the storage process.

The energy storage stage plays the following roles in the four-stage system: 1) storing the energy generated in the system or absorbed from the environment, for the consumption after a period of time as desired, thereby improving the energy utilization efficiency; and 2) realizing the primary potential utilization and the secondary potential utilization, thereby achieving a system energy efficiency gain.

The stage of energy regeneration refers to a process in which the complementary energy of the energy utilization stage, energy generation stage and energy storage stage is collected and provided again to other stages of the present system (for example, the stage of energy generation or an energy efficiency gain device). If the present system utilizes the complementary energy of an external system, this part of energy should be counted to the stage of energy generation, rather than the regeneration stage.

The stage of energy regeneration is nonlinear in the system. Because the energy input to the regeneration stage mainly comes from the complementary energy generated in other stages in the system, and the output ends thereof are also connected to other stages in the system, a closed-loop feedback is formed in the system. After the complementary energy is absorbed in the regeneration stage, a positive feedback recycle of system energy efficiency is formed, thus a nonlinear effect of energy efficiency (i.e., an energy efficiency gain) is generated.

In the event that the energy generated in the energy generation stage matches the energy consumed in the energy utilization stage, considering the regulation in the storage stage and the regeneration stage, stepped utilization of mixed energy and process optimization may be realized. For example, the stepped utilization of heat energy may be realized by heat energy storage.

It should be noted that, the concepts of the four stages, that is, energy generation, energy storage, energy utilization and energy regeneration, are not limited to conventional meanings. For example, traditional electric power plants are conventional electric energy generation enterprises. However, in this application, for example a generator inside an electric power plant is further regarded as the energy generation stage, the emission recovery system inside the electric power plant is regarded as the energy regeneration stage, and a power utilization equipment inside the electric power plant is regarded as the energy utilization stage. Therefore, a traditional electric power plant forms one node of the ubiquitous energy network described below, rather than being regarded as an independent energy generation stage.

The traditional electric network provides a limited electric energy storage capability, that is, it comprises an energy storage stage with a limited capacity. The power supplying end is required to continuously generate electric energy to maintain an energy flow on the links. Further, a traditional electric energy utilization system generally does not include the stage of energy regeneration. For example, on the utilization end, a part of the electric energy is released to the atmosphere in the form of waste heat generated by electric appliances.

Based on the above findings, the inventors put forward an energy efficiency four-stage system, which includes a system energy efficiency controller, and energy generation, energy storage, energy utilization and energy regeneration.

Referring to FIGS. 2(a)-2(f), an energy generation device 101 includes, but not limited to, a solar electric power generation and/or heating device 1011, a wind electric power generation device 1012, a geotherm electric power generation and/or heating device 1013, a nuclear electric power generation and/or heating device 1014, a steam electric power generation and/or heating device 1015 and a Combined Cooling, Heating and Power (CCHP) device 1016.

The CCHP device 1016 is one selected from a gas turbine, an internal-combustion engine, a fuel cell, a radiant panel coupled solar panel (PVR) and a CCHP system. The CCHP is established based on the concept of the stepped utilization of energy, and is a combined total energy system that integrates the cooling, heating (warming and hot water supplying) and electric power generation processes. In the CCHP, the power generating unit and the air conditioning unit shares the same engine, thus the energy utilization efficiency may be improved significantly, and the discharge of carbon dioxide and other pollutants is reduced.

Further, referring to FIG. 3(a), the input of the energy generation device 101 mainly includes solar energy, geotherm, wind energy, geotherm, nuclear, coal and biomass, etc., and the input is converted into mixed energy with three different forms: gas (fuel gas), electricity and heat. Those three raw materials enter the fuel gas network, the electric network and the heating network, respectively, and are transmitted to an energy utilization device 103 on the utilization end. Moreover, hot water and/or cold water may also be generated by the energy generation device 101 and provided to the energy utilization device 103 via a hot water and/or cold water pipeline network.

Preferably, in an energy generation device, the primary energy are converted into a secondary energy such as electricity, heat, cold and gas that may be directly utilized by the utilization stage.

For example, biomass is first converted into methane gas in a biological fuel gas device 1017 via four stages of blending, fermenting, purifying and separating, and then the methane gas is provided to the CCHP device 1016 as raw material; and coal is first gasified into coal gas in an atmospheric pressure catalytic device 1018, and then the coal gas is provided to the CCHP device 1016.

Preferably, the energy generation device includes a heat energy generation device that generates heat energy by utilizing the exhaust gas and waste heat generated by the electric power generation device, and/or an electric energy generation device that generates electric energy by utilizing the exhaust gas and waste heat generated by the electric power generation device.

Further, referring to FIG. 3(b), an energy storage device 102 includes, but not limited to, an electricity storage device 1021 and a heat storage and/or cold storage device 1022. The electricity storage device 1021 is, for example, a vanadium redox battery or a lithium ion battery, and the heat storage and/or cold storage device 1022 is, for example, a heat and/or cold storage tank.

The energy storage device 102 is adapted to receive the electric energy, heat energy, hot water and/or cold water provided by the energy generation device 101, and provide the same to the energy utilization device 103 as required.

Further, referring to FIG. 3(c), the energy utilization device 103 includes, but not limited to, a charging station 1031, a gas filling station 1032, a factory power utilization equipment 1033, a villa 1034, an apartment 1035 and a smart energy service system 1036.

The energy utilization device 103 generates and provides emissions such as carbon dioxide and waste water to an energy regeneration device 104.

Further, referring to FIG. 3(d), the energy regeneration device 104 includes, but not limited to, a carbon dioxide processing device 1041 (for example, a biological energy factory based on microalgae carbon absorption) and a waste water processing device 1042.

The cooperation of material flow, energy flow and information flow, the dynamic matching of energy sources with different grades, and the stepped utilization are accomplished under the optimizing and adjusting by the system energy efficiency controller.

Topological Structure of a Ubiquitous Energy Network

Further, the inventors put forward a multi-energy utilization solution for a ubiquitous energy network, the basic architecture of which is an interconnected network of an information flow, an energy flow and a material flow that are bidirectionally transmitted, coupled and cooperated, thereby forming a smart energy network system.

The energy flow transmitted on the ubiquitous energy network includes, but not limited to, electric energy and heat energy. Moreover, a material flow such as natural gas, hot water, cold water, $CO_2$ and biogas may be also transmitted on the ubiquitous energy network.

A ubiquitous energy flow is a tri-flow, that is, a logic smart flow formed by coupling and cooperating an energy flow, a material flow and an information flow; in a ubiquitous energy network, the ubiquitous energy flow flows to each node in the ubiquitous energy network, so that the nodes are associated with one another through the bidirectional ubiquitous energy flow which is used as a carrier. The essence of ubiquitous energy flow is the coupling and cooperating of those three kinds of energy; a nonlinear effect generated via the tri-flow coupling and cooperating is the energy efficiency gain; and the ubiquitous energy flow is a smart flow. Therefore, the intelligence of the ubiquitous energy network is based on the tri-flow coupling and cooperating.

Figure 4:
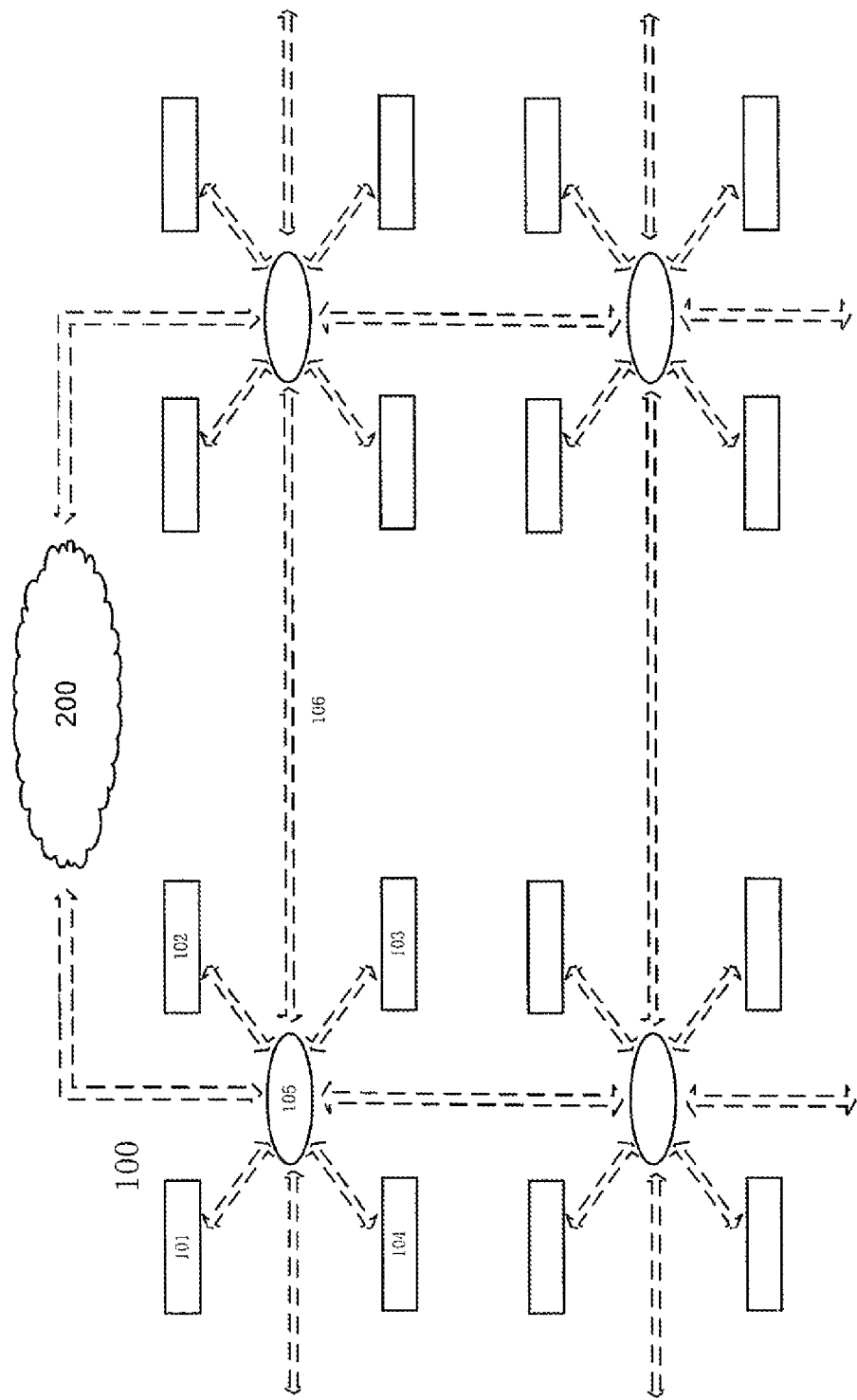
FIG. 4 shows a topological graph of a ubiquitous energy network.

FIG. 4 shows a topological graph of a ubiquitous energy network for realizing multi-energy utilization. The ubiquitous energy network includes a network formed by interconnecting nodes 100. The nodes of the ubiquitous energy network may include a set of the four stages or a subset thereof, i.e., one or more of the energy generation device 101, the energy storage device 102, the energy utilization device 103 and the energy regeneration device 104.

The ubiquitous energy network can not only access to a traditional electric energy generating enterprise and a traditional home, but also access to a novel distributed energy source, for example, a home equipped with solar electric power generation or wind electric power generation, and a living area equipped with a geotherm pump. Generally, a distributed energy system is located near an energy utilization device.

A system energy efficiency controller 105 is connected with any one of the energy generation device 101, the energy storage device 102, the energy utilization device 103 and the energy regeneration device 104 in the node 100, and connected with other nodes at the immediately higher level, the same level and/or the next lower level, for controlling the input and output of the ubiquitous energy flow between the four stages and between the nodes via virtual pipelines 106.

In one preferred embodiment, the nodes 100 are further directly or indirectly connected to a transaction server 200, and a user of the energy utilization device in any node may obtain the information about the type of intended energy from the transaction server 200 and purchase the energy therefrom, and then obtain the energy via the virtual pipeline 106.

The virtual pipeline 106 includes a set of an interconnected network and a local area network for transmitting an information flow, an electric network and a heating network for transmitting an energy flow, and a fuel gas network, a hot water and/or cold water pipeline network, a carbon dioxide recovery pipeline network, a waste water recovery pipeline network and even a material transportation equipment for transmitting a material flow. The material flow or energy flow network is connected with all the devices and equipments in the regional four stages.

The virtual pipeline 106 is a carrier for transmitting a ubiquitous energy flow. The energy flow or material flow that flows in the virtual pipeline 106 of the ubiquitous energy network is provided with a virtual tag, and it may be simply interpreted as an energy module combination with a perception information tag that is visible currently.

The meeting points of the virtual pipelines 106 act as the nodes of the ubiquitous energy network 100, and the system energy efficiency controller 105 realizes the accessing and routing for an energy terminal at the node. A ubiquitous energy flow may circulate unobstructedly between any nodes on the network. The pipelines of a ubiquitous energy flow may be based on a physical entity, or may be virtual pipelines without physical entity, for example, a physical entity pipeline across the Pacific Ocean may be virtual and no such a visible pipeline is built. A virtual pipeline must coexist with a pipeline that has a physical entity, and such a physical entity pipeline may be simply interpreted as currently visible natural gas pipeline, power line, water pipe and oil transmission pipeline, for example, and it may also be formed by planes, ships, automobiles and trains, etc.

coupled with an information communication pipeline; thus the physical entity pipeline may have various forms, for example, a power line combining information communication and electric power transmission, or a pipeline coupling a natural gas pipeline and an information communication optical fiber. A node equipment accomplishes the accessing and routing for ubiquitous energy flow terminals. Providers of the pipeline and node equipments are in charge of the development and support of the pipelines and node equipments, and operators that construct and operate the pipelines are in charge of the construction and maintenance of the pipelines.

Each layer or each level of subnetwork of the ubiquitous energy network is constructed based on the basic architecture of an energy efficiency four-stage system. The real world, from the urban energy network to a living area or even a home, is a four-stage energy network subdivided level by level. Therefore, in a physical region, an energy network in a distributed form is actually an ordered energy network that is nested layer by layer and link by link strictly according to the four-stage architecture. Such a structural orderliness establishes a physical foundation having the optimal structure for the system energy efficiency optimization in the region.

Some nodes and their subnodes include a system energy efficiency controller and a complete set of four stages of energy generation, energy storage, energy utilization and energy regeneration, thereby forming the above energy efficiency four-stage system.

However, other nodes may only include a system energy efficiency controller and a subset of the four stages of energy generation, energy storage, energy utilization and energy regeneration, for example, as described above, a traditional electric power plant is not a four-stage system, but it may form a node so long as it is connected to a system energy efficiency controller via a system energy efficiency controller. The ubiquitous energy network of the invention can be accessed by a traditional electric power plant, a traditional home and a novel distributed energy system (for example, a home solar electric power generation device and a regional wind electric power generation device), so long as a complete energy efficiency four-stage system is finally formed in the whole network.

The virtual tag is a data encapsulation of information generated by labeling, sensing and controlling at least one of the energy generation device, the energy storage device, the energy utilization device and the energy regeneration device.

The virtual tag is a part of the information flow transmitted on the ubiquitous energy network, which allows the information flow to be coupled with the energy flow and material flow transmitted in the ubiquitous energy network. For example, in a ubiquitous energy network, electric energy with a virtual tag is transmitted in a specific situation, a composite module of electric energy and natural gas with a virtual tag is transmitted in a specific situation, a composite module of electric energy and heat energy with a virtual tag is transmitted in a specific situation, and a composite module of electric energy, biogas and cold energy with a virtual tag is transmitted in a specific situation.

For example, a virtual tag includes the following information:

an Energy Type, which may be any one of or a combination of electricity, natural gas, heat, cold, CO2, biogas, etc.;

a Producer, which may be manufacturer, a controllable region, or a virtual transaction participator;

Carbon Discharge, including a carbon tax, a carbon index, a tax reduction and subsidy; and Others such as date and place.

Such a higher-grade form of energy, which is called ubiquitous energy, is consumed and provided by an access terminal. An access terminal for ubiquitous energy flow must get access to the network to obtain or provide ubiquitous energy. The ubiquitous energy flow terminal may be an equipment of various scales and forms, for example, a steam electric power plant, a nuclear electric power plant, a solar photoelectricity integration equipment, an automobile charging and discharging battery, a solar charging station, a biomass pool, a wind electric power station, a computer, a refrigerator, a gas turbine, a single building, a city, a region and home that are visible at present. In a word, all the current energy utilization, energy generation, energy storage and energy regeneration terminal equipments may be amended by adding an interface module that supports the access to a ubiquitous energy network.

For example, a chargeable and dischargeable battery of a hybrid power vehicle may be added with a virtual tag, a charging and discharging line interface and a communication module interface to access to a system energy efficiency controller, so as to obtain and/or provide electric energy with a virtual tag from the ubiquitous energy network.

Transaction and Service via Ubiquitous Energy Network

In the ubiquitous energy network of the above infrastructures, various service and operation supporting systems may be exploited for supporting the supply and demand service and transaction of ubiquitous energy. The mode of transactions based on the ubiquitous energy network, in which an intermediate conversion stage is added between supply and demand parties, is different from the current traditional mode in which the supply and demanding parties transact directly. Although the selection between the supply and demand parties looks like a direct selection, the demanding party may combine and select randomly and freely from the supplying parties distributed over the nation or even over the world; but the completion of transaction after the selection must go through an intermediate conversion stage, which is a transaction service established based on the ubiquitous energy network.

Referring to FIG. 4, as one of the nodes of a ubiquitous energy network, the transaction server 200 controls the energy transaction and service of the nodes connected directly or indirectly therewith, and the transaction server includes: a storage device, for storing virtual tags containing the energy-related information of a plurality of energy generation devices and/or energy storage devices; and a real-time price generation device, for generating a real-time price according to the virtual tags of the plurality of energy generation devices and the plurality of energy storage devices and the demand by the energy utilization device, where, the transaction server provides the virtual tags of the energy generation devices and the energy storage devices and the real-time price information to the energy utilization device according to a request thereof.

The method for providing energy transaction and service via the transaction server 200 includes the following steps:

a) a plurality of energy generation devices and/or energy storage devices transmit a virtual tag containing energy-related information to a ubiquitous energy network;

b) a transaction server generates a real-time price according to the virtual tags of a plurality of energy generation devices and a plurality of energy storage devices and the demand of an energy utilization device;

c) the energy utilization device obtains the virtual tags of the energy generation devices and energy storage devices and the real-time price information from the transaction server;

d) the energy utilization device selects an energy source according to the information obtained; and e) the energy utilization device obtains the energy via a virtual pipeline.

The entity that manages the transaction service may be separated from the entity that constructs the infrastructure of the ubiquitous energy network. The main function and technology of the transaction service includes: providing a P2P dedicated service solution for the supply and demanding parties based on a geographic information technology, a GPS technology, cloud calculation and cloud storage technologies. For example, after a home user selects any one of the supplying parties on the ubiquitous energy network, the server will automatically calculates a price for the user in real time; therefore, although different home users select the same supplying party, the price distribution feature will be based on the real-time price on the network, and the price will not be a constant price fixed by the supplying party, instead, it will be a price calculated for the user based on the selling price of the supplying party, which is a real-time distribution function. Companies such as Google and Amazon are bound to appear as the companies for managing the transaction service. On the viewpoint of the demanding party, although it seems that the ubiquitous energy of a certain supplying party is purchased directly, the physical energy actually used may not be from this supplying party, instead, it may be from another supplying party nearby scheduled by the transaction service. In the event of the access to the system energy efficiency controller, the free selection range between the supply and demanding parties will be enlarged greatly, and physical impossibility will become possible. This is the revolutionary advancement brought along by the technical charm and technical advancement of the ubiquitous energy network.

In the trading market on a virtual ubiquitous energy network, a middleman wholesales the energy generated by an energy generation device and resales or retails the same to an energy utilization device, an energy storage device or an energy regeneration device via a transaction platform. The role of the middleman is like a bank in a financial system, and one of the important functions thereof is the depositing (for example, ubiquitous energy supply) and the withdrawing (for example, ubiquitous energy utilization) by the clients. The energy (e.g. ubiquitous energy) purchased from the middleman by a buyer according to a virtual tag may not necessarily be the energy generated by an energy generation device, but the virtual tag of the energy must be generated by the energy generation device, just like the case that a banknote withdrawn from a bank by a client may not necessarily be the banknote deposited by this client. Both the vendor and the purchaser do not care about the technical measures by which the middleman accomplishes the transaction, and but care about the final price and quality.

The technical measures taken by the middleman include a platform based on the ubiquitous energy network, the virtual pipeline of which may help the middleman to lower energy loss and to alleviate transportation costs, thereby realizing energy saving, emission reduction and efficiency gain.

Regional energy may participate, in the form of a virtual factory, in the virtual energy market via a ubiquitous energy gateway, and a home user may be bound and participate in the energy market to strengthen their power of speech.

A transaction service via the ubiquitous energy network can be used to provide intelligentized and individualized services, and the development degrees of its intelligence are graded and staged depending on its evolution progress. The current energy utilization mode is mainly based on people's wish, and causes a great waste. The ubiquitous energy network is smart due to the integration of human's intelligence, and can provide an economical and high-performance energy utilization solution by sensing the energy utilization environment. The energy utilization mode may vary with the environment, the ubiquitous energy environment between human and things and between one thing and other mutually induces and interacts. Thus, such an energy utilization mechanism based on the ubiquitous energy network makes each party smart, and mutual intelligentization is realized among human beings; and under such a competition mechanism, a solution of clean energy that is advanced, high-performance and environment friendly will certainly win out, and an energy crisis will turn into an opportunity, thus human and nature will coexist harmoniously. The current regenerable energy such as solar energy, wind energy and hydraulic energy and the regenerated energy such as biogas and hydrogen are likely to win out in the future. The future urban living environment may be figured out; for example in a living area, at the beginning of construction, besides building construction, it is important to plan the environment of the building, make full use of the natural environment energy, create a harmonious ecological system, systematically plan solar energy utilization, wind energy utilization, geothermal energy utilization and regenerated energy utilization, and select natural resource energy in accordance with local conditions; therefore, the living area may act as a subsystem of integrated and stepped energy utilization and become an access terminal of the ubiquitous energy network, and may not only be a demanding party of energy utilization, but also be a supplying party of energy generation, thereby freely and equally participating in the transactions on the ubiquitous energy network. A family in the living area may also act as an access terminal of the ubiquitous energy network, and freely and equally participate in the transactions on the ubiquitous energy network together with the living area. As a result, the traditional energy utilization concept will be broken; for example, the energy used by a large enterprise might be a collection of the residual, inexpensive and multiform of energies from a plurality of families, which is impossible in the current energy utilization mode.

Logic Structure of Ubiquitous Energy Network

Figure 5:
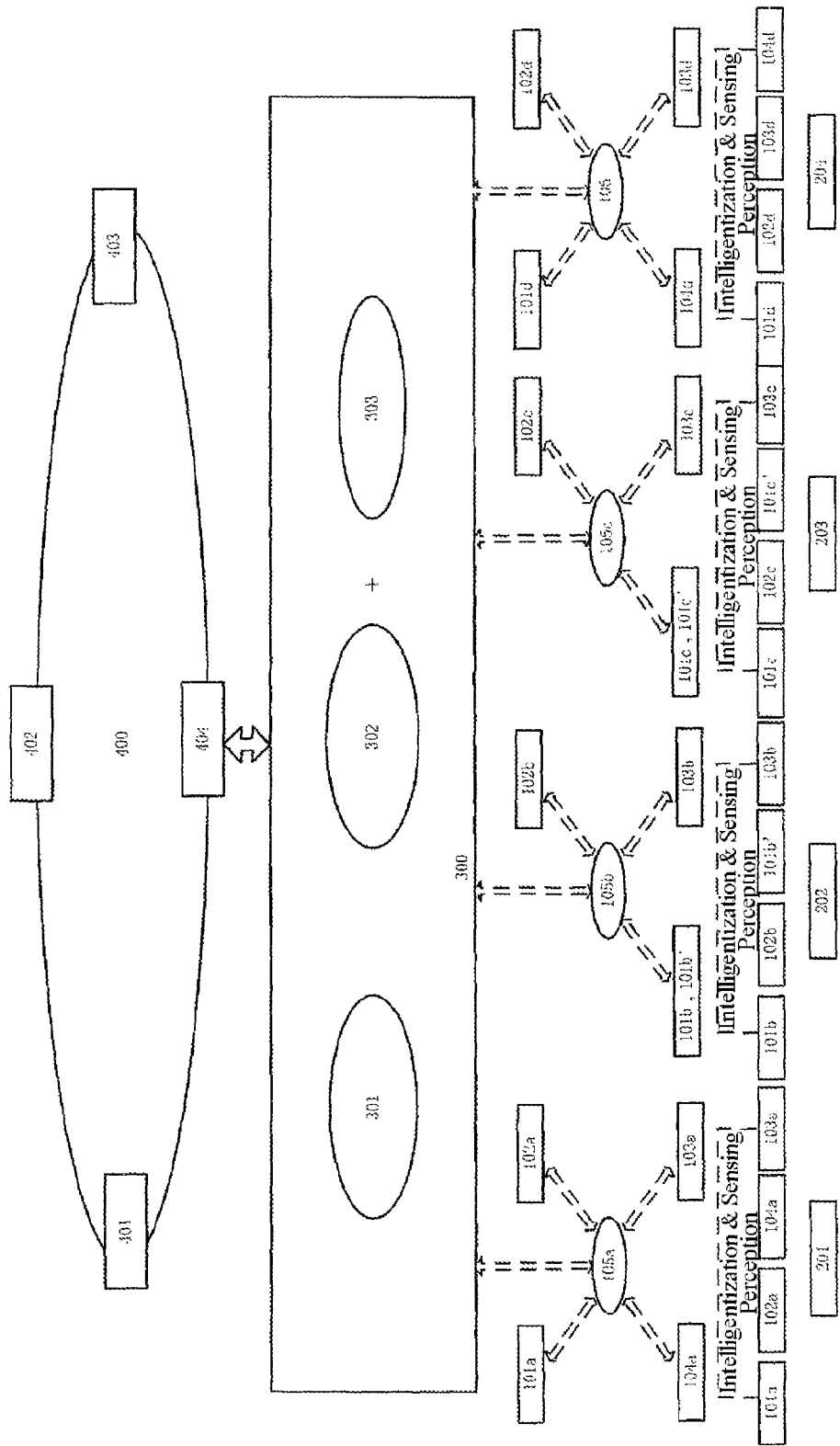
FIG. 5 shows a logic structure of a ubiquitous energy network.

FIG. 5 is a schematic diagram showing the logic structure of a ubiquitous energy network, which includes, for example, four types of nodes 201-204 on a machine-machine mutual sensing layer of the ubiquitous energy network, a smart service platform 300 on a human-machine interaction layer of the ubiquitous energy network and a human-human mutual intelligentization system 400 of the ubiquitous energy network.

A family node 201, which includes a solar panel 101a, a battery cell 102a, an electric appliance 103a and a mini microalgae carbon absorption device 104a, accesses to the ubiquitous energy network via a home gateway 105a.

A building or living area node 202, which includes a solar panel 101b, a biomass pool 101b', a battery cell 102b and a smart building 103b, accesses to the ubiquitous energy network via a local area gateway 105b, but does not include an energy regeneration device.

A traffic node 203, which includes a solar charging station 101c, a biomass pool 101c', a battery cell 102c and a smart traffic system 103c, accesses to the ubiquitous energy network via a traffic gateway 105c, but does not include an energy regeneration device.

An urban node 204, which includes a solar electric power station 101d, a battery cell 102d, a power utilization facility 103d and a large microalgae carbon absorption factory 104d, accesses to the ubiquitous energy network via an urban gateway 105d.

The ubiquitous energy network further provides a smart service platform 300 on the human-machine interaction layer. An interconnected network communication service 301, an energy efficiency optimization service 302 and a transaction service 303 are provided on the smart service platform. The energy efficiency optimization service 302 includes energy matching, energy routing, energy efficiency gaining and energy efficiency controlling, etc.

The ubiquitous energy network also brings about a novel human-human mutual intelligentization system 400, which provides an expert decision function. The mutual intelligentization system includes mechanisms corresponding to the energy efficiency four-stage system, that is, an energy generation mechanism 401, an energy storage mechanism 402, an energy utilization mechanism 403 and an energy environmental protection department 404, as well as a system energy efficiency controlling mechanism on the human-human mutual intelligentization layer of the ubiquitous energy network.

In the four stages of energy generation, storage, utilization and regeneration, the coupling of information and energy is implemented via labeling and sensing that exist everywhere, and then the intelligentization of the machine-machine mutual sensing layer is implemented via networking and controlling. Such intelligentization is a result of the solidifying of the existing energy utilization rules to a networking and controlling equipment.

The ubiquitous energy network results from the integration of a distributed smart network and a centralized network, and is consisted of a plurality of physical layers, e.g. home, region and urban. Each layer is consisted of an energy efficiency four-stage system, and is characterized by three virtual layers, i.e. mutual sensing, interaction and mutual intelligentization. A giant artificial smart energy network system may be obtained from the transversal coupling and cooperation of the traditional smart electric network, fuel gas network, heating network, material flow network and information network via the system energy efficiency controller of the ubiquitous energy network, and the longitudinal coupling and cooperation characterized by the three virtual logic layers of mutual sensing, interaction and mutual intelligentization.

The home layer, regional layer and urban layer of the ubiquitous energy network are main objects of distributed energy sources; corresponding to the disperse feature of clean energy sources such as solar energy, wind energy and geothermal energy, the home, regional and urban layers in the ubiquitous energy network are not only energy utilization units, but also energy generation and storage units in accordance with local conditions. Thus, a clean, high-performance, smart, and secure network is formed based on the mutual sensing, interaction and mutual intelligentization of the ubiquitous energy network.

At home, for example, the activity of a person may be perceived via a temperature sensor, an illuminance sensor, a human body perception sensor, etc., thereby the settings of equipments such as a light and an air conditioner in each room may be regulated, which is the mutual sensing with the environment. A Home Energy Management System (HEMS) may provide an advice to utilize electricity or gas via an algorithm performed on the gas price and the electricity price, which is the interaction after coupling and cooperation. After collecting the detailed information of electricity, gas, water, and cold and heat utilization by a user for a period of time, a home energy utilization model may further be constructed via artificial intelligence technologies, and HEMS intelligence may be further programmed to be automatic smart response-enabled via spatio-temporal optimization technologies, etc.

On the human-machine interaction layer, the ubiquitous energy network provides a platform for human-machine interaction. A human may provide reasonable operational instructions according to a higher-level command and operational conditions of various control equipments inside the system and deliver the instructions to a controlled equipment on the mutual sensing layer; human-machine interaction mainly solves the energy efficiency problem that cannot be solved or be well solved by the machine-machine mutual sensing, and provides measures and a management and control platform for human intelligence.

A network service platform based on the ubiquitous energy network receives information dynamically (in real time and non-real time) fed back by a lower layer, and determines whether to form an event and the type of the event according to the definition on event type, and a decision command is formed for an event that is difficult to decide via a human-human mutual intelligentization network on the human-human mutual intelligentization layer, thereby a corresponding decision command is delivered to the human-machine interaction layer for processing.

The ubiquitous energy network coordinates the machine-machine, human-machine, and human-human network relations via the mutual sensing, interaction and mutual intelligentization.

The ubiquitous energy network is a smart energy network system in which information, energy and material are mingled via smart cooperation, and is a uniform and harmonious ubiquitous network system existing everywhere that integrates the "intelligence" of human world and the "energy" of material world. The "energy" of the ubiquitous energy network is embodied by an energy system that is constructed based on multi-convariety mixed energy sources (for example, electricity, heat and gas), complete four-stage life-cycle (including energy generation, storage and transportation, utilization and regeneration); and the "intelligence" of the ubiquitous energy network is embodied by a three-layer decision optimization system formed by mutual sensing (machine-machine), interaction (human-machine) and mutual intelligentization (human-human). On one hand, the integration of "intelligence" and "energy" solves the object of system energy efficiency optimization of an energy network constructed based on energy efficiency four-stage system; and on the other hand, it achieves an effect of human intelligence on the nonlinear change of the system energy efficiency of the ubiquitous energy network. For example, the effect of an energy policy change on a regional energy system is much greater than the contribution of a physical-layer equipment on system energy saving.

The ubiquitous energy network has a first characteristic of "intelligence" as described above. Here, the intelligence refers to a logic optimization decision system, which comprises a three-layer smart optimization decision of machine-machine mutual sensing, human-machine interaction and human-human mutual intelligentization. For the first layer of transversal optimization, so-called machine-machine mutual sensing refers to the realization of the most basic control and optimization on the energy efficiency four-stage system via smart perception of a machine, so that the system can operate steadily and reliably without human interference, and such intelligence may be interpreted as basic algorithms and programs in the machine. For the second layer of transversal optimization, human-machine interaction requires a human to interfere with a system according to a certain optimization object, so that a program (or action) in the machine is changed, and finally a certain optimization object such as an economic object and a local energy efficiency optimization object is accomplished. For the third layer of transversal optimization, human-human mutual intelligentization is in fact a society decision system, it may be simply interpreted as a mutual negotiation among people for solving a problem and finally making a decision, or it may be interpreted as that people are making an optimization decision (object) on a thing.

Three-Layer Longitudinal Optimization: the smart decision optimization of those three layers described above is mutually associated and dependent. A decision of human-human mutual intelligentization is delivered via a human-machine interface to be interpreted and executed at the machine layer. Therefore, the three-layer logic optimization decision system does not necessarily correspond to a certain physical layer, and a certain physical layer may comprise at least one layer of optimization. For example, a control system for those four stages actually comprises a control layer, a managing and controlling layer and a scheduling layer, and the overall control optimization is jointly accomplished by a machine (e.g. controller, optimizer) and a human (e.g. operator, decision maker).

It should be pointed out that, the three-layer smart optimization decision system of the ubiquitous energy network is different from the traditional information intelligence system, here, the intelligentization solved by the former is the overall optimization decision of the energy efficiency four-stage system, rather than of a single stage or a single energy form; therefore, the object, strategy and mechanism of the three-layer smart optimization decision system are totally different from those of the existing or traditional IT network, control network or single-energy network.

System Energy Efficiency Controller and Energy Efficiency Gain Device

The system energy efficiency controller 105 includes at least two of a terminal, an exchanger, a router, a logic controller, a building controller, an industrial control machine, a special-purpose control system/controller and an energy efficiency optimizer.

The system energy efficiency controller 105 obtains state information of the energy generation device 101, the energy storage device 102, the energy utilization device 103 and the energy regeneration device 104 connected therewith, and transfers a control command to each of the devices, thus forming complete closed-loop control, thereby performing the energy efficiency optimization.

It should be noted that, although FIG. 4 shows a system energy efficiency controller 105 within one node, but the role of the system energy efficiency controller 105 is not limited to this node. The system energy efficiency controllers 105 of various nodes on the ubiquitous energy network may implement cooperative control. For example, the system energy efficiency controller 105 of the immediately higher-level node can not only control the energy generation device 101, the energy storage device 102, the energy utilization device 103 and the energy regeneration device 104 in this node, but also control the system energy efficiency controller in the next lower-level node.

The energy efficiency optimizer includes a process optimizer, a stage optimizer, a gas/electric/heating network optimizer, a central optimizer, a simulator or emulator, a client-side publisher, an exchanger, a router and a terminal The overall energy consumption may be lowered by fine tuning the steady-state operating parameters of the equipments. The process optimizer is adapted to improve a residual-heat efficiency for the stepped utilization of heat energy, thereby improving the energy conversion efficiency of the system.

For example, the process optimizer is connected to a plurality of energy generation devices 101, and starts or stops at least one of said plurality of energy generation devices 101 in response to the change of the system energy efficiency. The energy storage device 102 includes a heat and/or cold storage tank, and the process optimizer starts or stops the energy storage device 102 to implement cross-period or cross-season heat or cold storage.

For example, the energy generation device 101 includes a solar electric power generation device, the energy storage device 102 includes at least one of a vanadium redox battery and a lithium ion battery, and the process optimizer is adapted to start or stop the energy storage device 102 to balance the output power fluctuation of the energy generation device 101.

The system energy efficiency controller 105 realizes the above machine-machine mutual sensing, thereby realizing the closed-loop control on the energy generation device 101, the energy storage device 102, the energy utilization device 103 and the energy regeneration device 104.

Moreover, the system energy efficiency controller 105 provides, to a manager, information for a decision on optimizing the energy efficiency and controlling.

The following optimization and control strategies are realized.

The regulation for the energy matching between the stage of energy generation and the stage of energy utilization stage is realized, thereby realizing dynamic peak modulation and spatio-temporal optimization;

The stepped utilization of mixed energy and the process optimization may be realized based on the energy matching between the stage of energy generation and the stage of energy utilization, plus the regulation in the storage stage and the regeneration stage;

Based on the four-stage energy efficiency closed-loop control, the dynamic matching, dynamic balancing and dynamic optimization of regional mixed energy may be realized via information integration by the system energy efficiency controller, thereby realizing the gain of regional system energy efficiency.

Briefly, the difference between the system energy efficiency controller and the traditional controller mainly lies in that, the system energy efficiency controller performs uniform adaption on mixed energy sources, rather than a single energy source, which embodies the key concept of system energy efficiency.

The system energy efficiency controller 105 may control a stage energy efficiency controller on the next lower level, and the stage energy efficiency controller in turn controls a premise point energy efficiency controller in the stage. For example, the input to the energy efficiency controller at the stage of energy generation may be from an electricity, heat and gas premise energy efficiency controller, resulting in an input of mixed energy sources which is then input to the energy efficiency controller at the stage of energy generation; the energy efficiency controller at the stage of energy generation inputs the mixed energy generated into the energy efficiency controller at the utilization stage via a secondary regulation in an energy matching manner. The system energy efficiency controller 105 realizes the cooperative regulation of the stage energy efficiency controller and the premise point energy efficiency controller, until the energy efficiency on the utilization end reaches the target value.

The primary energy may be converted into the secondary energy such as electricity, heat and cold that may be supplied to the utilization stage for direct utilization, via the stage of energy generation. Although, in comparison with the traditional utilization mode, such a stepped utilization mode of energy apparently improves the energy utilization efficiency of the system, the energy structure at the stage of energy generation is relatively fixed, which is inconsistent with the ever changing ratio of the secondary energy required at the utilization stage. The ratio of electricity to heat at a common generation end is 1:1, while the ratio of electricity to heat at a common utilization end is 1:2 to 1:3; this generally means that a high-grade primary energy needs to be consumed directly to obtain a low-grade heat or cold required. The grade of such heat and cold required for heating and cooling is very low, and a great resource waste would be caused when a primary energy is directly employed for obtaining the heat and cold.

The energy efficiency gain device includes a system energy efficiency controller and a potential energy pump connected therewith. The potential energy pump is connected with a distributed electric power generation device, a heat or cold generation device, a heat or cold storage device and an energy utilization device. The potential energy pump consumes the electric energy provided by an electric energy generation device, upgrades the waste heat generated by the energy utilization device 103 to a utilizable higher grade, and transmits the upgraded heat energy to a heat storage device 102 or directly supplies the upgraded heat to an energy utilization device 103.

For example, the potential energy pump is a heat pump.

According to the state information of the energy utilization device, the system energy efficiency controller 105 starts an energy efficiency gain device to collect and upgrade waste heat when the energy utilization device 103 generates the waste heat, and stores the heat energy generated into the energy storage device 102 (in the case of "series connection" configuration) or directly supplies the same to an energy utilization device (in the case of "closed-loop" configuration).

The energy efficiency gain device, energy generation, storage and transportation, and utilization and regeneration form an extended four-stage system, thereby realizing the closed-loop utilization of mixed energy and the energy efficiency gain.

In an energy efficiency gain device, a potential energy pump (for example, a heat pump) cooperates with the energy storage device 102 to accomplish the recycle and utilization of residual heat, overpressure and geotherm, and the mixed energy output is directly or indirectly provided to the energy utilization device 103 for matched utilizing, thereby realizing cyclic utilization of mixed energy at the four stages above; by absorbing the environment potential energy time after time, the effect of energy efficiency gain may be realized gradually, the ratio of the input primary energy may be reduced, the ratio of regenerable energy may be increased, and the discharge of $CO_2$ may be reduced, thereby realizing low-carbon utilization.

With a potential energy pump such as a heat pump, the energy efficiency gain device upgrades the grade of the low-grade environment potential energy in the environment that cannot be utilized at the stage of energy utilization, and drives multiple amount of environment potential energy to reach a utilizable higher grade with a small amount of high-grade energy, for example, electric energy. Therefore, the energy utilization efficiency of the extended four-stage system comprising the energy efficiency gain device is greatly improved.

Energy Efficiency Optimization and Evaluation

The method for optimizing the energy system may be divided into five levels according to the level and the influence on the overall system:

Structure Optimization

The structure optimization mainly refers to a significant change of the topological structure of the overall energy flow of the system, and the energy system is designed, optimized and planed in terms of the space and time structure according to the design philosophy of the energy efficiency four-stage system, starting from system energy efficiency optimization and gain. The four stages form a closed-loop system of complete life-cycle utilization of energy, and a positive feedback at the structure layer of the system energy efficiency may be formed, thereby achieving the effect of system energy saving and energy efficiency gain. For example, a series connection system may be modified to a parallel connection system, and a parallel connection system may be modified to a series connection system, or one or more stages are added to or reduced from the four stages of the energy efficiency system; for example, an energy generation stage and an energy storage stage are added to an energy efficiency system with only the utilization stage. The structure optimization has a significant influence on the system; traditionally, optimization is conducted experientially only during the system design process, and it is difficult to change once a system structure is fixed. In the case of a flow specifically designed with a flexible structure, it is possible to achieve the effect of dynamic optimization of the overall structure by dynamically regulating some devices. At this point, the optimization algorithm may be used to automatically adjusting structure parameters, and an optimization effect of energy structure modification may be achieved via parameter adjustment.

Mode Optimization

The mode optimization refers to the upgrade of a single equipment important to the system and breakthrough innovation of the energy utilization mode, which brings about great upgrade of the overall energy efficiency of the system. For example, the energy efficiency upgrade technology that combines a heat pump and energy storage can make full use of environment potential energy and greatly improve the electricity-heat conversion efficiency; and the technology of regenerative combustion can apparently improve the conversion rate of coal gasification.

Spatio-temporal Optimization

Spatio-temporal optimization is one of the advanced control strategies of the system energy efficiency controller; the feature of the spatio-temporal optimization is embodied by the primary potential utilization and the secondary potential utilization embody, and the quality and quantity of the environment potential energy is matched with the demand of the system energy utilization stage, thereby realizing the conversion of environment potential energy into energy usable for the system. An object of the spatio-temporal optimization is to achieve the optimization of both time and space operating characteristic of energy, thereby achieving the efficiency optimization of the four-stage energy efficiency system during the complete life-cycle. The optimization in time dimension includes the dynamic matching between energy generation and energy utilization, day-night peak modulation, cross-season energy storage, etc. For example, the power fluctuation of a solar battery is regulated by employing an energy storage battery, the day-night temperature difference of a building is regulated by employing cold and heat storage technologies, thereby increasing the COP coefficient of heating and/or cooling; and the heat energy utilization efficiency may be further improved by employing cross-season cold and heat storage technologies. Space optimization includes energy complementary regulation in different space; for example, the lighting, heating and operating status of electric appliances in different regions of a building may be dynamically regulated according to the activities of people inside the building and data monitored in real time, thus an energy saving effect may be realized in the event that normal functions are guaranteed.

Process Optimization

Process optimization is a mature technology that is often used in chemical system optimization. In system energy efficiency optimization technologies, this method is also used to optimize an energy system, so that the coupling and cooperation of the energy flow, the material flow and the information flow may be realized, thereby an optimal matching may be achieved, and the object of process optimization of system energy efficiency may be realized. Process optimization may be conducted at the stage of designing, in a way that analog simulation on the energy system is conducted by various chemical flow simulation software, and technological parameter design of the system and type selection of the equipment are performed according to the simulation result. In the stage of system operation, a real-time or quasi-real time simulation optimization is conducted via simplified process simulation, thereby the control parameters of each device may be optimized in real time. By regulating the steady-state operating parameters of each equipment, the energy utilization efficiency of the system may be improved, and the energy consumption of the overall system may be lowered; the parameter adjustment of the process optimization generally does not include changing the parameters of the topological structure of the system, which are usually continuous variables and are far from the critical point of nonlinear mutation. For example, a residual-heat efficiency is added to the stepped utilization of heat energy, thereby improving the energy conversion efficiency of the system.

Premise Optimization

Premise point optimization is an optimization and improvement of a single equipment or device, but does not include any revolutionary innovation technology, in other words, the improvement of the single equipment has little action on the improvement of the energy efficiency of the whole system. For example, a smart electric appliances inside a building can save energy, a low-power dissipation IT equipment can save energy, and an industrial pump equipment employs a frequency-variable technology and exactly regulates the frequency to achieve an optimal efficiency.

A system energy efficiency evaluation system performs energy efficiency analyzation according to the real-time data collected by a DCS or the data dynamically simulated by an HYSYS, which includes:

an exergy analyzation model, in which the physical exergy, chemical exergy and diffusion exergy of each strand of the material flows and energy flows are determined according to parameters such as temperature, pressure, flow quantity and constituent; the production function of each unit is determined using fuel-product definition, and the exergy dissipation, exergy efficiency and exergy dissipation coefficient of each stage is determined;

a heat economic model, in which the characteristic equation, exergy cost equation and heat economic cost equation of the system are established, and the exergy cost and exergy economic cost of each strand of exergy flow are obtained; a complete set of four-stage exergy analyzation and heat economic analyzation method is constructed based on the second law of thermodynamics and the heat economic structural theory. For example, in the stage of energy generation, the production interaction between equipments is quantized using a heat economic model, an exergy cost and heat economic cost model based on the fuel-product definition, thereby analyzing thermodynamic process and its distribution rules for the forming of system cost;

a performance diagnosis model, in which the deviation between the actual operating condition and the reference operating condition is obtain using a heat economic diagnosis model based on reference operating condition data, and the cause for the deviation is analyzed and quantized;

an optimization model, in which an optimization model that considers Efficiency-Economy-Environment is established, and integration optimization, design optimization and operation optimization are conducted on the system.

Optimization of Single System at the stage of energy generation, combined generation and cyclic generation of multi-type mixed energy sources is implemented.

The energy efficiency of traditionally generating a single-type energy is relatively low. The energy generation stage of system energy efficiency refers to a mixed energy generation contributed by various energy generation equipments, and includes various forms of Combined Heat and Power and Combined Gas and Steam, for example. The stage of energy generation is controlled by an energy efficiency controller at the stage of energy generation, so that the type and quantity of energy to be generated is dynamically regulated according to the energy supply and demand on the ubiquitous energy network. The schedule strategy for energy generation in the system energy efficiency technology is different from the traditional supply and demand matching strategy, and the most significant feature of such schedule strategy is that the energy generation stage and the energy utilization stage are not directly associated with each other, but connected via an intermediate layer, i.e. the ubiquitous energy gateway. The ubiquitous energy gateway is consisted of an energy efficiency gain device and an energy efficiency matching station, and the energy efficiency gain device is consisted of a potential energy pump and a system energy efficiency controller. The ubiquitous energy gateway may absorb the environment potential energy on the basis that quantity and grade matching of energy is realized, thereby realizing the energy efficiency gain. The energy generation stage and the ubiquitous energy gateway both have the function of performing quantity and grade matching of energy, thus the four-stage system is an energy system having a structure with two layers of dynamic matching; during the actual operating process, dynamic optimization and control on the converting and matching strategy may be performed by the system energy efficiency controller according to the monitored operating status of the ubiquitous energy network and devices in the four stages.

Energy Efficiency Four-Stage System comprising an Energy Efficiency Matching Station The energy efficiency four-stage system is an energy selforganized system, and it is not only a system, but also a basic unit of another energy selforganized system. By the space and time structure design, the energy efficiency four-stage system has the following functions and characteristics as an energy selforganized system:

a) Opening System: The system may absorb a sufficiently large negentropy flow by smartly absorbing the environment potential energy and information, so that the system may always be kept in an entropy reduction process;

b) Closed-Loop Stage: The four stages are closed-loop and may form a positive feedback at the structure layer;

c) A combination of a potential energy pump and a controller forms a positive feedback at the phase transition layer;

d) Matching of quality and quantity of energy, and spatio-temporal optimization;

e) Optimal matching of those three flows described above, and process optimization;

f) Optimization of A Single System as follows:
  i) at the Generation Stage: generation of mixed energy sources and cyclic generation
  ii) at the Storage Stage: the primary and secondary potential utilization, and energy conversion
  iii) at the Utilization Stage: a constant value system, a power system
  iv) at the Regeneration Stage: a nonlinear stage (positive feedback)
  v) at the Energy Efficiency Gain Device: with the external primary and secondary potential utilization, phase transition optimization of internal mixed medium based on ordinal variables is implemented.

Firstly, the energy efficiency four-stage system is an opening system, i.e., a system with evolved intelligence that may continuously exchange material, energy and information with the external environment. An energy efficiency four-stage system can obtain a gain of system energy efficiency by absorbing the renewable exergy and low-grade environment potential energy from the environment, realize its selforganizing and ordering by absorbing the negentropy from the environment, and continuously improve the system efficiency and intelligence, thereby realizing the self-upgrade and self-evolution of the system. The core of the energy efficiency four-stage system, i.e., the system energy efficiency controller, is connected with smart terminals of the four-stage equipments, a ubiquitous energy network node and a ubiquitous energy gateway via an information network, predicts the flow direction change and flow quantity fluctuation of the energy flow, material flow and information flow in a future period of time according to the flow quantity and flow direction of the energy flow, information flow and material flow that are monitored in real time, adjusts the control parameters of the four-stage equipment and the ubiquitous energy network equipment in time, and makes full use of the environment potential energy and renewable exergy while the system energy efficiency optimization is achieved. Briefly, the system energy efficiency controller is not only the core to realize the interaction and cooperation of information and energy, but also the physical carrier for realizing selforganizing and ordering of the system. The physical carrier for the energy efficiency four-stage system to absorb environment potential energy may be a potential energy pump, and the motive power of the potential energy pump itself is provided by the renewable exergy (for example, solar energy) in the environment, and further, the physical carrier may absorb the low-grade environment potential energy, thereby realizing system energy efficiency gain. An energy efficiency matching station has both functions of energy flow regulation and energy type conversion, and can dynamically regulates the type, flow quantity and grade of the energy flow input and output according to the information flow input of the system energy efficiency controller, thereby realizing the dynamic matching of the type and grade of energy and realizing the ordering of flow directions of the supplied and demanded energy. The ubiquitous energy network is a smart energy network that integrates an information network, an energy network and material network, and is the physical carrier of a ubiquitous energy flow; the most significant difference from the traditional network is that the ubiquitous energy network can not only transmit an information flow to the system energy efficiency controller, but also regulate the topological structure of the network and the transmission mode of the ubiquitous energy flow at any moment according to an information flow feedback from the system energy efficiency controller and couple the energy, information and material to realize the highest energy efficiency and smart cooperation. The energy efficiency four-stage system may absorb a sufficiently large negentropy flow by smartly absorbing the environment potential energy and information, so that the system may always be kept in an entropy reduction process and continuously evolved to be smarter and better ordered.

The energy generation stage of the system energy efficiency refers to the generation of the mixed energy formed by various types of energy sources, for example, various forms of Combined Heat and Power and Combined Gas and Steam; the stage of energy generation is controlled by a generation stage energy efficiency controller, and the type and quantity of energy to be generated is dynamically regulated according to the energy supply and demand on the ubiquitous energy network. The adaption strategy of energy generation in the system energy efficiency technology is different from the traditional supply and demand matching strategy, and the most significant feature thereof is that the energy generation stage and the energy utilization stage are not directly associated with each other, but connected via an intermediate layer, i.e. the ubiquitous energy gateway. The ubiquitous energy gateway is consisted of an energy efficiency gain device and an energy efficiency matching station, and may absorb the environment potential energy on the basis that energy type and grade matching is realized, thereby realizing an energy efficiency gain. The stage of energy generation and the ubiquitous energy gateway both have the function of performing type and grade matching of energy. Therefore, the energy efficiency four-stage system is an energy system having a structure with two layers of dynamic matching; and during the actual operating process, dynamic optimization and control on the converting and matching strategy may be performed by the system energy efficiency controller according to the monitored operating status of the ubiquitous energy network and devices in the four stages.

Figure 6:
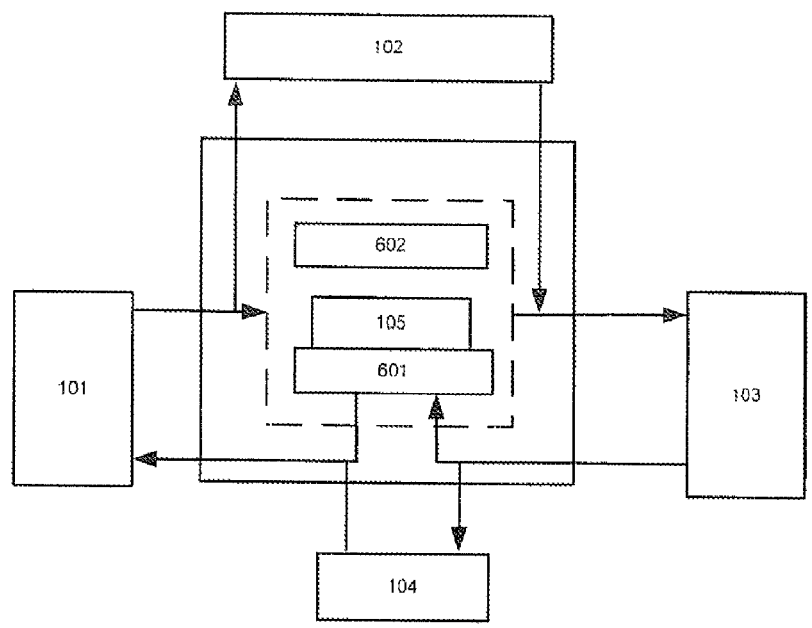
FIG. 6 shows a schematic diagram of an energy efficiency four-stage system including an energy efficiency matching station.

FIG. 6 shows a schematic diagram of an energy efficiency four-stage system comprising an energy efficiency matching station. The energy efficiency four-stage system includes four stages of an energy generation device 101, an energy storage device 102, an energy utilization device 103 and an energy regeneration device 104, and an potential energy pump 601 and a CCHP device 602. The energy efficiency matching station includes a system energy efficiency controller 105, a potential energy pump 601 and a CCHP device 602. The energy efficiency gain device includes a system energy efficiency controller 105 and a potential energy pump 601.

The ubiquitous energy flow generated by the energy generation device 101 is provided to an energy efficiency matching station, and the system energy efficiency controller 105 distributes the ubiquitous energy flow to a CCHP device 602 in the energy efficiency matching station, or the potential energy pump 601 or the energy storage device 102.

The ubiquitous energy flow matched and upgraded by the energy efficiency matching station is output to the energy utilization device 103, and the system energy efficiency controller 105 may also cooperate with the energy storage device 102 to output a ubiquitous energy flow to the energy utilization device 103.

The complementary energy unspent by the energy utilization device 103 is input to the energy regeneration device 104 or the potential energy pump 101.

The energy regeneration device 104 and the potential energy pump 601 return the recovered or upgraded ubiquitous energy flow to the energy generation device 101.

The system energy efficiency controller 105 systematically regulates and controls the four stages described above and the energy efficiency matching station according to the demand for ubiquitous energy of the energy utilization device 103.

Inside the energy efficiency matching station, when the ubiquitous energy supplied by the energy generation device 101 and the energy storage device 102 meets the demand of the energy utilization device 103, the system energy efficiency controller 105 will not start the energy efficiency matching station.

When the ubiquitous energy supplied by the energy generation device 101 and the energy storage device 102 cannot meet the demand of the energy utilization device 103, which may be met when the potential energy pump 601 is started, the system energy efficiency controller 105 preferably starts the potential energy pump 601.

If the demand of the energy utilization device 103 cannot be met when all of the energy generation device 101, the energy storage device 102 and the potential energy pump 601 are started, the system energy efficiency controller 105 will start the CCHP device 602 to meet the demand of the energy utilization device 103.

Energy Efficiency Matching Station

Figure 7:
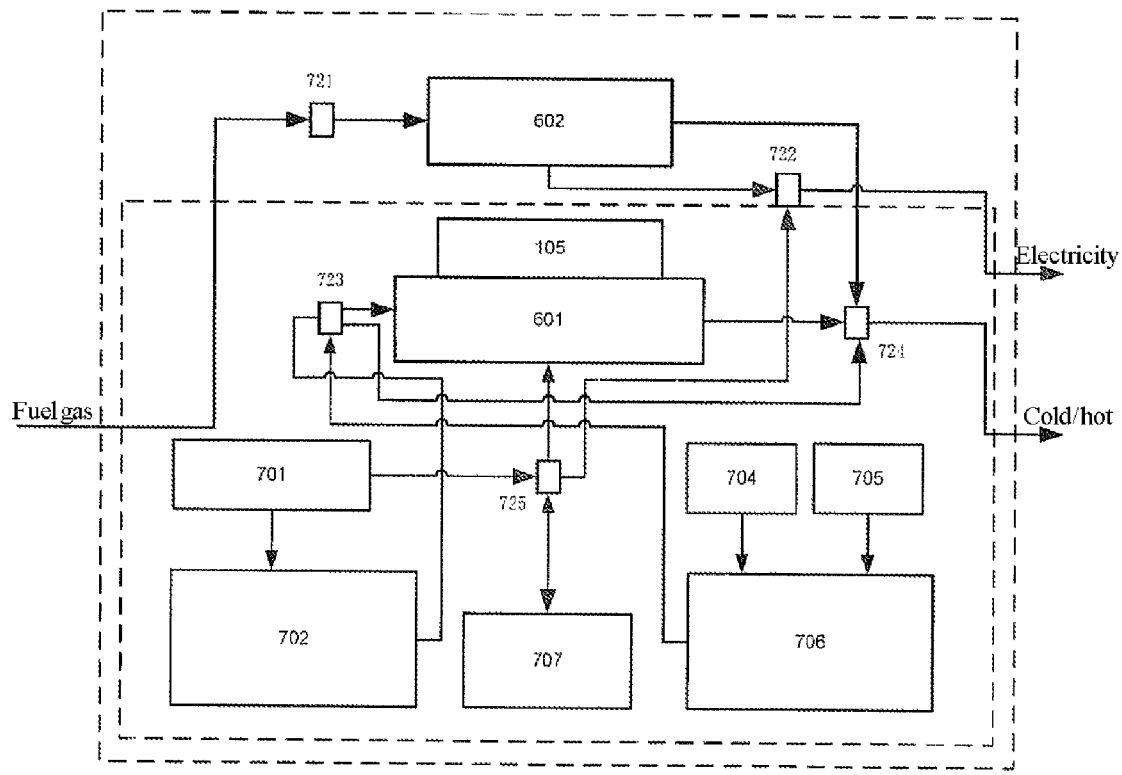
FIG. 7 shows a schematic diagram of an energy efficiency matching station.

FIG. 7 shows a schematic diagram of an energy efficiency matching station. The energy efficiency matching station include: a system energy efficiency controller 105, a potential energy pump 601 and a CCHP device 602.

All the equipments in the energy efficiency matching station are regulated and controlled by the system energy efficiency controller 105.

After passing a fuel gas controller 721, fuel gas enters the CCHP device 602 quantificationally, and the electric power generated by the CCHP device 602 is delivered to a power supply controller 722, and the cold or heat generated is delivered to a heating controller 724.

The electric power generated by a wind-light complemented and solar-heat integrated device 701 is delivered to an electric power controller 725. The electric power controller 725 distributes the electric power to a potential energy pump 601 or an electricity storage device 707 or a power supply controller 722. The power supply controller 722 transmits the electric power to energy utilization devices outside the system. The electric power controller 725 may also obtain electric power from the electricity storage device 707.

The heat collected by the wind-light complemented and solar-heat integrated device 701 is delivered to a heat storage device 702, and the heat is provided to an energy collection controller 723 as desired.

The cold collected by a cold and heat conducting pipe 704 and a radiation cooling device 705 is delivered to a cold storage device 706, and the cold is provided to the energy collection controller 723 as desired.

The energy collection controller 723 distributes the heat or cold to the potential energy pump 601, and the heat or cold is upgraded and then delivered to the heating controller 724. The energy collection controller 723 may also directly distribute the heat or cold to the heating controller 724. The heating controller 724 transmits the heat or cold to energy utilization devices outside the system.

The system energy efficiency controller 105 receives information inside and outside the system. When the potential energy pump 601 can individually meet the demand of an energy utilization device, the CCHP device 602 need not be started, and the fuel gas controller 721 is cut off; and when the demand cannot be met, the above device will be started for cooperative power supply.

The electric power generated and delivered to the electric power controller 725 by the wind-light complemented and solar-heat integrated device 701 is preferably supplied to the power supply controller 722 for outputting to an energy utilization device; and the surplus electric power is preferably delivered to the potential energy pump 601; if there still exists surplus electric power, the electricity storage device 707 will be provided with such surplus electric power.

When the electric power cannot meet the demand, the electric power controller 725 will obtain electric power from the electricity storage device 707 and deliver it to the electric power controller 725. If the demand cannot be met yet, the system energy efficiency controller 105 will start the CCHP device 602 to send electric power to the electric power controller 725.

In summer, the solar heat collected by the wind-light complemented and solar-heat integrated device 701 is delivered to the heat storage device 702; and in winter, the heat in the heat storage device 702 is delivered to the energy collection controller 723; if the temperature of the heat is higher than 50° C., the energy collection controller 723 will directly supply the heat to the heating controller 724, which in turn outputs the heat to the energy utilization stage 103; if the temperature of the heat is lower than 50° C., the energy collection controller 723 will supply the heat to the potential energy pump 601, and the potential energy pump 601 will upgrade and then output the heat to the heating controller 724 and thus to the energy utilization stage 103. When the heat is insufficient, the system energy efficiency controller 105 starts the CCHP device 602 for compensation.

In winter, the atmosphere cold collected by the cold and heat conducting pipe 704 is delivered to a cold storage device 706. In summer, the cold in the cold storage device 706 is delivered to the energy collection controller 723; if the temperature is lower than 10° C., the energy collection controller 723 will directly supply the cold to the heating controller 724, which will output the cold to the energy utilization stage 103; if the temperature is higher than 10° C., the energy collection controller 723 will output the cold to the potential energy pump 601, which will in turn upgrade and then output the cold to the heating controller 724 and thus to the energy utilization stage 103. When the cold is insufficient, the system energy efficiency controller 105 be start the CCHP device 602 for compensation.

At night in summer, the radiation cooling device 705 radiates the heat to the atmosphere and stores the cold in the cold storage device 706; and in the daytime, the cold is supplied to the energy collection controller 723, and operate strategies are the same as above.

Figure 8A:
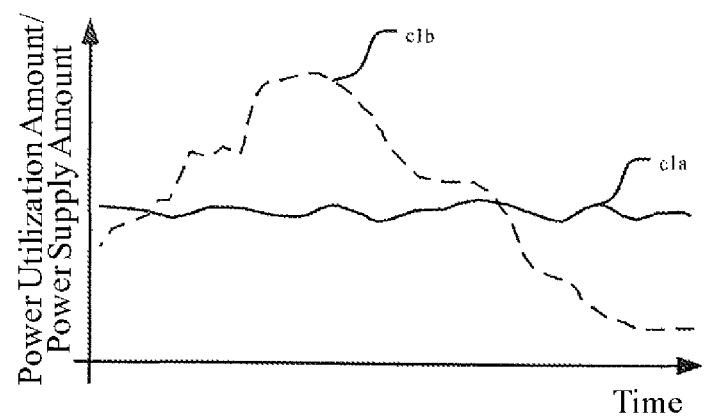
FIGS. 8a and 8b respectively show a schematic diagram of the system energy efficiencies of energy utilization implemented by a traditional electric network and a ubiquitous energy network.
Figure 8B:
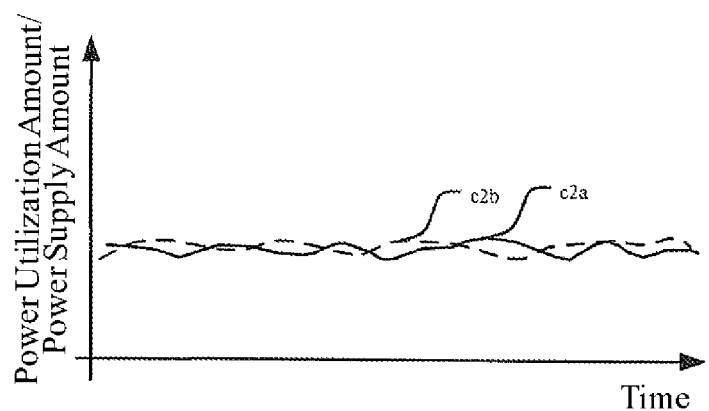

FIGS. 8*a* and 8*b* are schematic diagrams respectively showing the system energy efficiency of electric energy utilization managed by a traditional electric network and a ubiquitous energy network, where, curves c1*a* and c1*b* represent the variation of the amount of power supply (i.e., supply) and the amount of power utilization (i.e., demand) versus time on a traditional electric network, respectively, and curves c2*a* and c2*b* represent the variation of the amount of power supply (i.e., supply) and the amount of power utilization (i.e., demand) versus time on a ubiquitous energy network, respectively.

On the traditional electric network and the ubiquitous energy network, the amount of power supply is basically stable, and substantially will not change with time (for example, as shown by curves c1*a* and c2*a*). However, on the traditional electric network, the variation of the amount of power utilization versus time causes the mismatching between supply and demand, so that the system energy efficiency of the traditional electric network is very low. On the contrary, on the ubiquitous energy network, because a distributed electric power generation device and an electric energy storage device are introduced into a node, an effect of "peak clipping and trough filling" may be obtained, so that the amount of power utilization and the amount of power supply always match each other (for example, as shown by curves c1*b* and c2*b*), thus the system energy efficiency will be improved.

It should be noted that, on the ubiquitous energy network according to the invention, the distributed electric power generation devices and the electric energy storage devices within the whole network may be scheduled uniformly by interactively controlling the energy efficiency controller on each node, thus the action of "peak clipping and trough filling" may be maximized, which goes far beyond the concept of networking management on distributed electric power generation devices put forward in a smart electric network.

Moreover, as described above, the ubiquitous energy network according to the invention realizes a coupled utilization of multiple energies (a plurality of types of energies and/or energies from a plurality of geographic locations) by coupling the energy flow, the material flow and the information flow.

Although the present invention has been described above in conjunction with some specific preferred embodiments, it should be understood that the invention is not limited to such specific embodiments. Instead, various modifications and variations may be made without departing from the spirit or scope of the invention as defined by the appended claims and their equivalents.

What is claimed is:

1. A system energy efficiency controller for a ubiquitous energy network, which is connected to an energy generation device, an energy storage device, an energy utilization device and an energy regeneration device, comprising:

the system energy efficiency controller cooperatively controlling an input and an output of a ubiquitous energy flow of the energy generation device, the energy storage device, the energy utilization device and the energy regeneration device; and the ubiquitous energy flow includes a flow formed by cooperatively coupling an energy flow, a material flow and an information flow;

the ubiquitous energy network including a closed-loop smart energy network system formed with a complete life-cycle of an energy, and being formed by nodes that are connected together via a virtual pipeline interconnected network architecture for transmitting the ubiquitous energy flow, with the energy flow, material flow, and information flow being bidirectionally transmitted between the nodes; and the system energy efficiency controller connecting smart terminals of equipment in four stages for the energy generation device, energy storage device, energy utilization device, energy regeneration device, ubiquitous energy network nodes and ubiquitous energy gateways via a ubiquitous energy network, predicting a flow direction change and a flow quantity fluctuation of the energy flow, material flow, and information flow in a future period of time according to a flow quantity and a flow direction of the energy flow, the information flow, the material flow and according to an operating status of each equipment of the four stages that are monitored in real time, and timely adjusting control parameters of the ubiquitous energy network equipment of the four stages, the ubiquitous energy network nodes, and the ubiquitous energy gateways of the four stages according to the predicted flow quantity and flow direction, and the operating status of each equipment of the four stages, thereby fully utilizing an energy such as solar energy, geothermal energy and wind energy within a region where the four stages exist, and achieving an optimal system energy efficiency;

wherein the system energy efficiency controller realizes information and energy interaction and cooperation, and is a physical carrier that realizes self-organized ordering of the smart energy network system.

2. The system energy efficiency controller of claim 1, wherein, the energy generation device includes a distributed energy system.

3. The system energy efficiency controller of claim 2, wherein, the distributed energy system is located near the energy utilization device.

4. The system energy efficiency controller of claim 2, wherein, the distributed energy system includes an electric power generation device.

5. The system energy efficiency controller of claim 1, further comprising the energy generation device that includes at least the following:

a heat energy generation device that generates heat energy by utilizing exhaust gas and waste heat generated by an electric power generation device;

an electric energy generation device that generates electric energy by utilizing exhaust gas generated by the electric power generation device;

wherein the energy storage device is at least one of a vanadium redox battery, a lithium ion battery and a heat or cold storage tank;

the energy utilization device includes a charging station, a gas filling station, a factory power utilization equipment, a villa, an apartment and a smart energy service system; and the energy regeneration device includes a microalgae carbon absorption device, a waste water regeneration device and a waste heat regeneration device.

6. The system energy efficiency controller of claim 1, wherein, the system energy efficiency controller includes at least two of a terminal, an exchanger, a router, a logic controller, a building controller, an industrial control machine, a special-purpose control system or controller, and an energy efficiency optimizer.

7. The system energy efficiency controller of claim 6, wherein, the energy efficiency optimizer includes a process optimizer, a stage optimizer, a gas or electric or heating network optimizer, a central optimizer, a simulator or emulator, a client-side publisher, an exchanger, a router and a terminal.

8. The system energy efficiency controller of claim 7, wherein, the process optimizer lowers the overall energy consumption by fine tuning a steady-state operating parameter of each equipment; or the process optimizer improves a residual-heat efficiency in a stepped utilization of heat energy, to improve an energy conversion efficiency of the system; or the process optimizer is connected to a plurality of energy generation devices, and starts or stops at least one of said plurality of energy generation devices in response to a change of the system energy efficiency; or the energy storage device includes heat or cold storage tank; and the process optimizer starts or stops the energy storage device to perform cross-period or cross-season heat or cold storage; or the energy generation device includes solar electric power generation device, the energy storage device includes at least one of a vanadium redox battery and a lithium ion battery; and the process optimizer starts or stops the energy storage device to balance an output power fluctuation of the energy generation device.

9. The system energy efficiency controller of claim 1, wherein, the system energy efficiency controller obtains state information of the energy generation device, the energy storage device, the energy utilization device and the energy regeneration device connected therewith, and transfers a control command to the energy generation device, the energy storage device, the energy utilization device and the energy regeneration device to perform energy efficiency optimization.

10. The system energy efficiency controller of claim 1, wherein, the energy flow includes electric energy and heat energy; or the material flow is at least one selected from products generated by cold, heat, electricity and an energy regeneration device.

11. The system energy efficiency controller of claim 10, wherein, the material flow includes at least one of natural gas, hot water, cold water, CO2 and biogas; or the product generated by the energy regeneration device is helix algae.

12. The system energy efficiency controller of claim 1, wherein, the information flow includes virtual tags of the energy generation device, the energy storage device, the energy utilization device and the energy regeneration device and real-time price information of the energy.

13. The system energy efficiency controller of claim 12, wherein, the virtual tag is data encapsulation including attribute information of the energy flow and the material flow and at least one of the transmission source and the transmission destination.

14. The system energy efficiency controller of claim 1, wherein, the information flow is transmitted via at least one of an optical fiber, a power line carrier and an electric cable.

15. The system energy efficiency controller of claim 1, wherein, the system energy efficiency controller realizes machine-machine mutual sensing; or the system energy efficiency controller provides, to a manager, information for a decision on optimizing the energy efficiency and performing control.

16. An energy efficiency gain device, comprising: the system energy efficiency controller of claim 1 and a potential energy pump connected with the system energy efficiency controller, wherein:
the potential energy pump consumes electric energy provided by an electric energy generation device, upgrades waste heat generated by an energy utilization device to be utilizable, and transmits the upgraded heat to a heat storage device or supplies the upgraded heat directly to an energy utilization device for direct utilization.

17. The energy efficiency gain device of claim 16, further comprising: a distributed electric power generation device, a heat or cold generation device and a heat or cold storage device.

* * * * *